(12) United States Patent
Wengreen

(10) Patent No.: US 10,036,937 B1
(45) Date of Patent: Jul. 31, 2018

(54) MOUNTING SYSTEMS FOR ELECTRONIC DEVICES

(71) Applicant: Innovelis, Inc., Sammamish, WA (US)

(72) Inventor: Eric John Wengreen, Sammamish, WA (US)

(73) Assignee: Innovelis, Inc., Sammamish, WA (US)

( * ) Notice: Subject to any disclaimer, the term of this patent is extended or adjusted under 35 U.S.C. 154(b) by 0 days.

(21) Appl. No.: 15/821,733

(22) Filed: Nov. 22, 2017

Related U.S. Application Data

(63) Continuation-in-part of application No. 29/610,389, filed on Jul. 12, 2017.

(60) Provisional application No. 62/582,915, filed on Nov. 7, 2017, provisional application No. 62/528,381, filed on Jul. 3, 2017.

(51) Int. Cl.
| | |
|---|---|
| *G03B 17/56* | (2006.01) |
| *F16M 11/04* | (2006.01) |
| *F16M 13/02* | (2006.01) |
| *H01R 33/06* | (2006.01) |
| *H04N 5/225* | (2006.01) |

(52) U.S. Cl.
CPC ......... *G03B 17/561* (2013.01); *F16M 11/041* (2013.01); *F16M 13/02* (2013.01); *H01R 33/06* (2013.01); *H04N 5/2253* (2013.01)

(58) Field of Classification Search
None
See application file for complete search history.

(56) References Cited

U.S. PATENT DOCUMENTS

| | | |
|---|---|---|
| 5,539,821 A | 7/1996 | Blonder |
| 9,071,740 B1 | 6/2015 | Duffy |
| 2008/0136915 A1 | 6/2008 | Iwamura |

OTHER PUBLICATIONS

Mission Mount for Nest Cam—First publicly available at least as early as Nov. 2, 2015; Downloaded on May 31, 2018 from https://www.amazon.com/dp/B017H75H8S.

*Primary Examiner* — W B Perkey

(57) ABSTRACT

Mounting systems can couple cameras to other objects that support the cameras. A secure connection between the mounting system and the camera can help prevent the camera from inadvertently falling off the mounting system. Mounting systems can include multiple protrusions, retention features, and holes that facilitate mounting to power outlets.

24 Claims, 22 Drawing Sheets

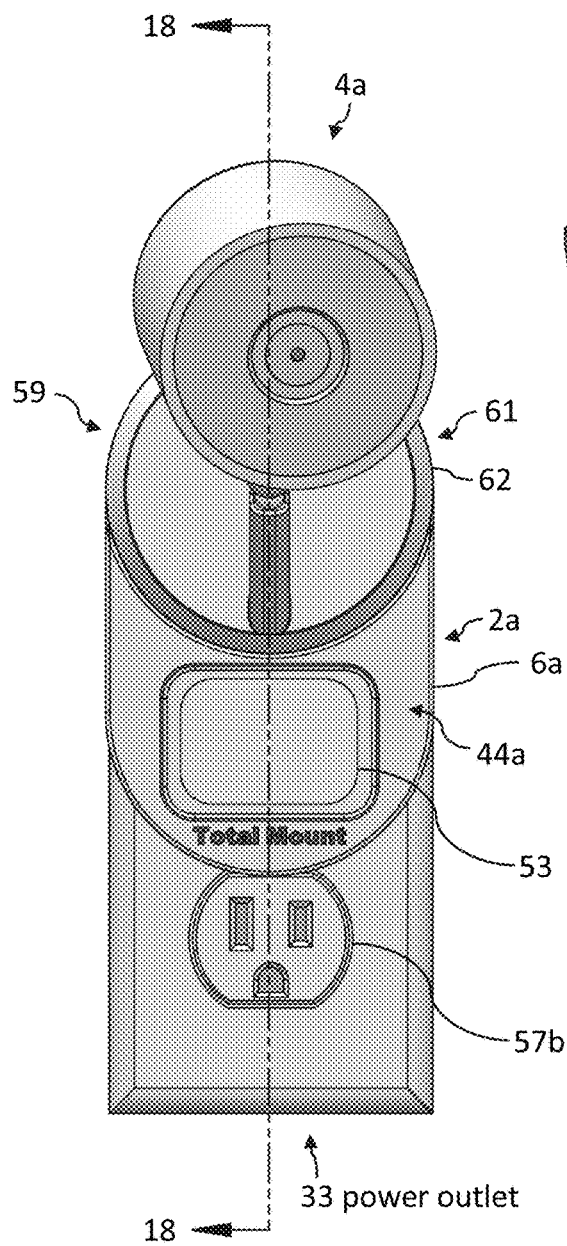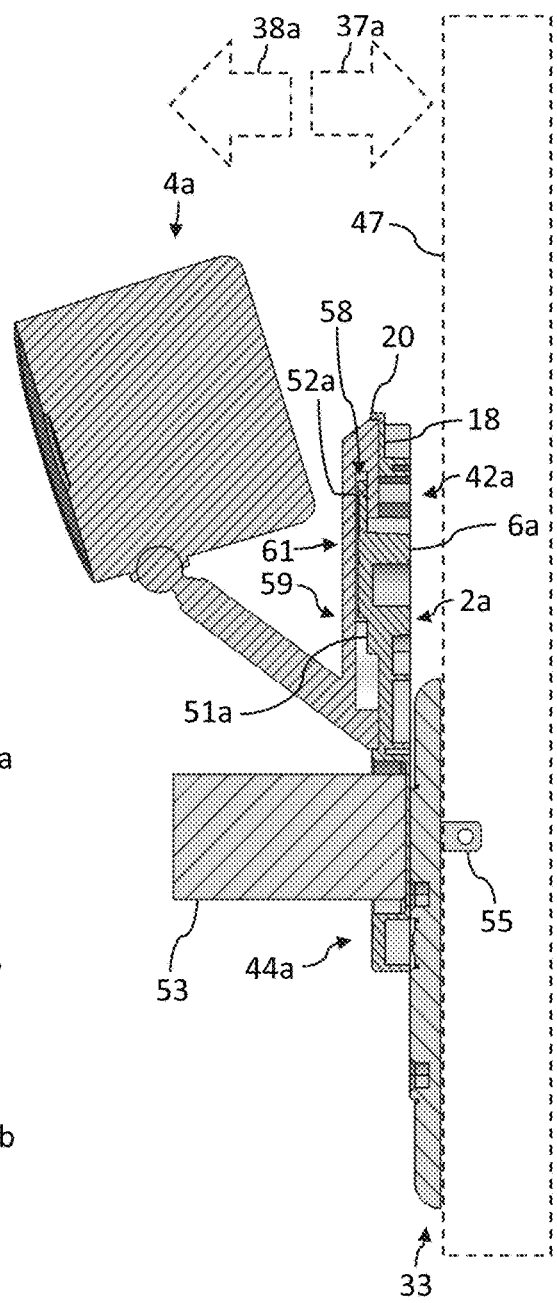
Figure 17
Figure 18A

MOUNTING SYSTEMS FOR ELECTRONIC DEVICES

CROSS-REFERENCE TO RELATED APPLICATIONS

The entire contents of the following application are incorporated by reference herein: U.S. Patent Application No. 62/582,915; filed Nov. 7, 2017; and entitled MOUNTING SYSTEMS FOR ELECTRONIC DEVICES.

The entire contents of the following application are incorporated by reference herein: U.S. Patent Application No. 62/528,381; filed Jul. 3, 2017; and entitled MOUNTING SYSTEMS FOR ELECTRONIC DEVICES.

The entire contents of the following application are incorporated by reference herein: U.S. patent application Ser. No. 29/610,389; filed Jul. 12, 2017; and entitled MOUNT FOR ELECTRONIC DEVICES.

BACKGROUND

Field

Various embodiments disclosed herein relate to mounting systems and mounting methods. Certain embodiments relate to mounting systems for electronic devices such as cameras.

Description of Related Art

Cameras such as Amazon.com's Echo Look and Cloud Cam can be mounted to diverse surfaces such as walls of a home or other building. A camera can include a wall-mounting plate that can be screwed to a wall. The camera can then be coupled to the wall-mounting plate in order to attach the camera to the wall. The included wall-mounting plate, however, relies on gravity to hold the camera securely. Thus, there is a need for mounting systems and methods that enable wall-mounting the camera in orientations in which gravity does not help secure the camera to the mounting plate.

Screwing the mounting plate to the wall can damage the wall (e.g., by creating screw holes). Thus, there is a need for mounting systems and methods that enable wall-mounting the camera without damaging the wall.

SUMMARY

Some embodiments comprise a mounting system for a camera system. In some embodiments, a mounting system comprises a base configured to couple the camera system to an object (e.g., a power outlet, a wall, a tripod) that supports the camera system, wherein the base comprises an outward side and an inward side.

In several embodiments, a mounting system comprises a first protrusion that protrudes away from the base in a first direction and a second protrusion coupled to the base by the first protrusion. The second protrusion can protrude away from the first protrusion in a second direction that is within plus or minus thirty degrees (and/or within plus or minus fifteen degrees) of perpendicular to the first direction.

In some embodiments, a mounting system comprises a flex arm coupled to the base and a retention lip coupled to the base by the flex arm. The retention lip can protrude in a third direction that is within plus or minus thirty degrees of parallel to the first direction (and/or within plus or minus fifteen degrees of parallel to the first direction. The flex arm can be configured to enable the retention lip to move inward (e.g., bend inward along an arc) to facilitate coupling the camera system to the mounting system.

Some embodiments comprise a mounting system for a camera system. Many different types of camera systems can be mounted with the mounting system. Some camera systems include a camera and a stand configured to hold the camera up and help orient the camera. The camera system can also include wireless communication (e.g., WiFi and/or cellular systems) to enable the camera to send videos and recorded audio to remote locations and/or to enable the camera to receive audio.

In several embodiments, mounting systems comprise a first base configured to couple the camera system to a power outlet. The first base can comprise an inward side configured to face towards a wall of a building to which the power outlet can be coupled and an outward side configured to face away from the wall. Mounting systems can comprise a first protrusion that protrudes outward from the first base in a first direction; and a second protrusion coupled to the first base by the first protrusion. The second protrusion can protrude away from the first protrusion in a second direction that is within plus or minus thirty degrees of perpendicular to the first direction. The second protrusion can be configured to removably secure the camera system to the first base.

In some embodiments, the camera system comprises a plug configured to receive electricity from a power outlet. An electrical cable can couple the plug to the camera system. The first base can couple the camera system to the power outlet. The plug can comprise at least one metal power prong configured to electrically couple the plug to the power outlet. The first base can comprise at least one hole oriented towards the power outlet. The power prong can be located at least partially in the hole and at least partially in the power outlet such that the plug is adapted to secure the first base to the power outlet.

In several embodiments, the hole comprises a central axis that is oriented within plus or minus thirty degrees of parallel to the first direction. The first protrusion can be cylindrical. The second protrusion can comprise a cantilever beam located in a cavity of the camera system to help secure the camera system to the power outlet.

In some embodiments, the first direction is within plus or minus thirty degrees of being directly outward, and the second direction is within plus or minus thirty degrees of at least one of vertically upward and vertically downward.

In several embodiments, the first direction is within plus or minus twenty degrees of being directly outward, and the second direction is within plus or minus twenty degrees of horizontal.

In some embodiments, the mounting system comprises the camera system. The camera system can comprise a second base having a cavity. The second base of the camera system can be coupled to the first base by the first protrusion and the second protrusion. At least a portion of the first protrusion and a portion of the second protrusion can be located in the cavity. At least a portion of the camera system can be secured between the second protrusion and the first base such that the first base couples the camera system to the power outlet.

In several embodiments, the mounting system comprises a flex arm coupled to the first base, and a retention lip coupled to the first base by the flex arm. The flex arm is configured to bend to enable coupling and uncoupling the camera system to at least a portion of the mounting system. The flex arm can be configured to removably secure the camera system to the first base. The retention lip can protrude in a third direction that is within plus or minus forty degrees of parallel to the first direction. The flex arm can comprise a cantilever beam configured to bend to enable the retention lip to move inward to facilitate coupling the camera system to the mounting system.

In some embodiments, the mounting system comprises a flex arm coupled to the first base, and a retention lip coupled to the first base by the flex arm. The flex arm can be configured to enable the retention lip to move inward to facilitate coupling the camera system to the mounting system. The retention lip can be configured to impede uncoupling the camera system from the mounting system until the flex arm is bent inward. The second protrusion can be located farther outward than the flex arm and the retention lip (e.g., even though the second protrusion, the flex arm, and the retention lip are not aligned such that they are located in series in an outward direction). The retention lip can be a protrusion configured to impede uncoupling the camera base from the mounting system. Moving the retention lip (e.g., by bending the flex arm) can permit uncoupling the camera base from the mounting system.

In several embodiments, the mounting system comprises a camera system, a flex arm coupled to the first base, and a retention lip coupled to the first base by the flex arm. The second protrusion can be located within a cavity of the camera system. The camera system can comprise a stand having an outer perimeter. The retention lip can be located farther radially than the outer perimeter of the stand such that at least one of the first protrusion and the second protrusion impede the camera system from sliding off the first base in a fifth direction and the retention lip impedes the camera system from sliding off the first base in a sixth direction that is opposite the fifth direction.

Several embodiments comprise a mounting system adapted to mount a camera system to a power outlet. Mounting systems can comprise a first base configured to couple the camera system to a power outlet, wherein the first base comprises an inward side configured to face towards a wall of a building to which the power outlet can be coupled and an upward side oriented within plus or minus twenty degrees of perpendicular to the inward side; a first protrusion that protrudes upward from the first base in a first direction; and a second protrusion coupled to the first base by the first protrusion. The second protrusion can protrude away from the first protrusion in a second direction that is within plus or minus thirty degrees of perpendicular to the first direction. The second protrusion can be configured to removably secure the camera system to the first base.

In some embodiments, the mounting system comprises the camera system, which can have a plug configured to receive electricity from a power outlet. An electrical cable can electrically and mechanically couple the plug to the camera system. The plug can comprise at least one power prong that electrically and mechanically couples the plug to the power outlet. The first base can comprise at least one hole oriented towards the power outlet. The power prong can be located partially in the hole and partially in the power outlet such that the plug is adapted to secure the first base to the power outlet.

In several embodiments, the hole comprises a central axis that is oriented within plus or minus thirty degrees of perpendicular to the first direction, the first protrusion is cylindrical, and the second protrusion comprises a cantilever beam located in a cavity of the camera system to help secure the camera system to the power outlet.

In some embodiments, the first direction is within plus or minus thirty degrees of being directly upward, and the second direction is within plus or minus thirty degrees of being horizontal.

In several embodiments, the mounting system comprises the camera system. The camera system can comprise a second base having a cavity. The second base of the camera system can be coupled to the first base by the first protrusion and the second protrusion. At least a portion of the first protrusion and a portion of the second protrusion can be located in the cavity. At least a portion of the camera system can be secured between the second protrusion and the first base.

In some embodiments, the mounting system comprises a flex arm coupled to the first base, a retention lip coupled to the first base by the flex arm, and a cavity formed at least in part by the flex arm and the first base. The retention lip can be configured to engage a portion of a stand of the camera system to impede the camera system from uncoupling from the mounting system. The flex arm can comprise a cantilever beam configured to bend into the cavity to facilitate coupling the camera system to the mounting system and uncoupling the camera system from the mounting system.

In several embodiments, the retention lip is configured to engage an outer perimeter of a stand of the camera system to impede the camera system from uncoupling from the mounting system. The flex arm can be configured to bend into the cavity to facilitate coupling the camera system to the mounting system and to facilitate uncoupling the camera system from the mounting system.

In some embodiments, the mounting system comprises a flex arm coupled to the first base and a retention lip coupled to the first base by the flex arm. The retention lip can protrude upward. The flex arm can be configured to enable the retention lip to move downward to facilitate coupling the camera system to the mounting system. The retention lip can be configured to impede uncoupling the camera system from the mounting system.

In several embodiments, the mounting system comprises a flex arm coupled to the first base, and a retention lip coupled to the first base by the flex arm. The flex arm can be configured to enable the retention lip to move to facilitate coupling the camera system to the mounting system. The retention lip can be configured to impede uncoupling the camera system from the mounting system until the flex arm is bent. The second protrusion can be located farther upward than the flex arm and the retention lip even though the second protrusion, the flex arm, and the retention lip are not aligned. (For example, the second protrusion, the flex arm, and the retention lip are typically not located in series in an outward direction.)

In some embodiments, the mounting system comprises camera system, a flex arm coupled to the first base, and a retention lip coupled to the first base by the flex arm. The camera system can comprise a stand having an outer perimeter. The second protrusion can be located within a cavity of the stand. The retention lip can be located farther radially than the outer perimeter of the stand such that at least one of the first protrusion and the second protrusion impede the camera system from sliding off the first base in a fifth direction and the retention lip impedes the camera system from sliding off the first base in a sixth direction that is opposite the fifth direction.

Some embodiments comprise a mounting system for a camera system. The mounting system can comprising a first base configured to couple the camera system to an object that supports the camera system, wherein the first base comprises an outward side and an inward side; a first protrusion that protrudes away from the first base in a first direction; a second protrusion coupled to the first base by the first protrusion, wherein the second protrusion protrudes away from the first protrusion in a second direction that is within plus or minus thirty degrees of perpendicular to the first direction, and the second protrusion is configured to removably secure the camera system to the first base; and a flex arm coupled to the first base.

In several embodiments, the mounting system comprises a retention lip coupled to the first base by the flex arm, wherein the retention lip protrudes in a third direction that is within plus or minus thirty degrees of parallel to the first direction, and the flex arm is configured to enable the retention lip to move inward to facilitate coupling the camera system to the mounting system.

In some embodiments, the flex arm comprises a cantilever beam that protrudes away from the first protrusion in a fourth direction that is within plus or minus thirty degrees of parallel to the second direction.

In several embodiments, the mounting system comprises the camera system coupled to the first base. At least a portion of the camera system can be secured between the first protrusion, the second protrusion, the flex arm, and the retention lip.

In some embodiments, the flex arm comprises a cantilever beam configured to bend to enable moving the retention lip. The second protrusion can be located farther outward than the flex arm and the retention lip.

In several embodiments, the first base comprises an open area in which at least a portion of the flex arm is located. The open area can be configured to enable the flex arm to bend inward until an outermost portion of the retention lip is located inward relative to the outward side of the first base without any portion of the flex arm being located inward relative to the inward side of the first base (e.g., to facilitate uncoupling the camera system from the mounting system).

In several embodiments, an outward side of the flex arm is within one millimeter of being coplanar with the outward side of the first base, an outermost portion of the retention lip is located farther outward than the outward side of the first base, and the outermost portion of the retention lip is located farther inward than an outermost portion of the second protrusion.

In some embodiments, a distal-most portion the retention lip is located farther radially than a distal-most portion of the second protrusion. The distal-most portion the retention lip is located farther as measured radially from a central axis of the cylindrical, first protrusion than an outer perimeter of the first base.

In several embodiments, the camera system coupled to the first base. The second protrusion can be located within a cavity of the camera system. The camera system can comprise a stand having an outer perimeter. The retention lip can be located farther radially (as measured radially from a central axis of the cylindrical, first protrusion) than the outer perimeter of the stand such that at least one of the first protrusion and the second protrusion impede the camera system from sliding off the first base in a fifth direction and the retention lip impedes the camera system from sliding off the first base in a sixth direction that is opposite the fifth direction.

In some embodiments, the retention lip comprises a slanted surface that faces towards an adjoining surface of the stand. The slanted surface can be configured such that pushing the adjoining surface towards the slanted surface causes the flex arm to bend inward to enable the camera system to decouple from the mounting system.

Some embodiments comprise the camera system coupled to the first base. The flex arm can comprise a cantilever beam. The camera system can comprise a stand having an outer perimeter. The retention lip can be configured to impede movement of the outer perimeter of the stand. The retention lip can be configured to enable a user to push the retention lip inward and/or downward to bend the cantilever beam to move the retention lip out of an uncoupling path of the mounting system to enable the user to uncouple the camera system from the mounting system.

BRIEF DESCRIPTION OF THE DRAWINGS

These and other features, aspects, and advantages are described below with reference to the drawings, which are intended to illustrate but not to limit the invention. In the drawings, like reference characters denote corresponding features consistently throughout similar embodiments. Not all items are labeled in each figure.

FIG. 17 illustrates a front view of a system, according to some embodiments.

FIGS. 18A and 18B illustrate cross-sectional views taken along line 18 from FIG. 17, according to some embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein. The features of each embodiment can be combined with the other embodiments.

Figure 1:
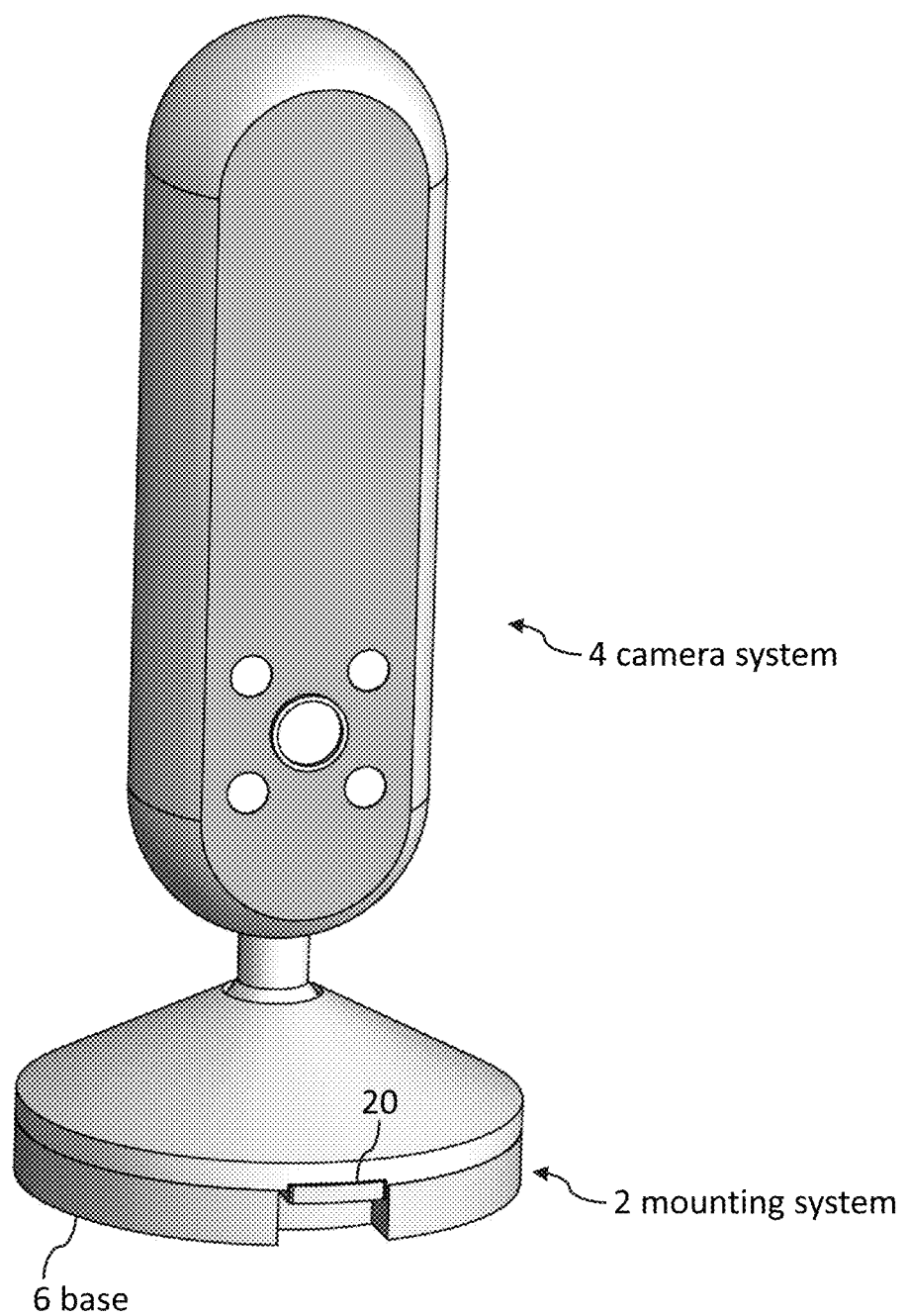
FIG. 1 illustrates a perspective view of camera system coupled to a mounting system, according to some embodiments.
Figure 8:
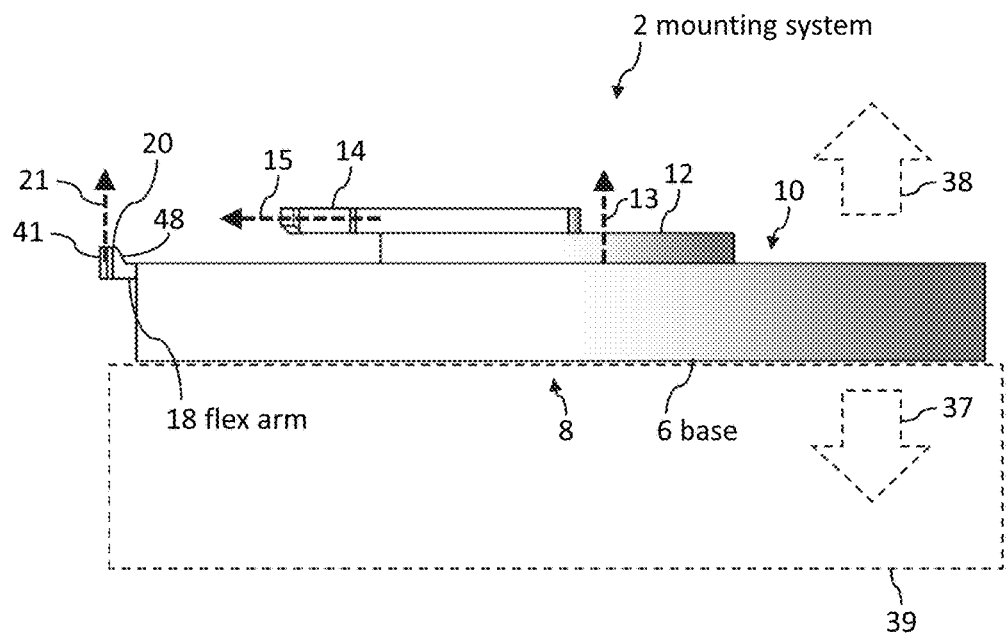
FIG. 8 illustrates a side view of the mounting system, according to some embodiments.
Figure 9:
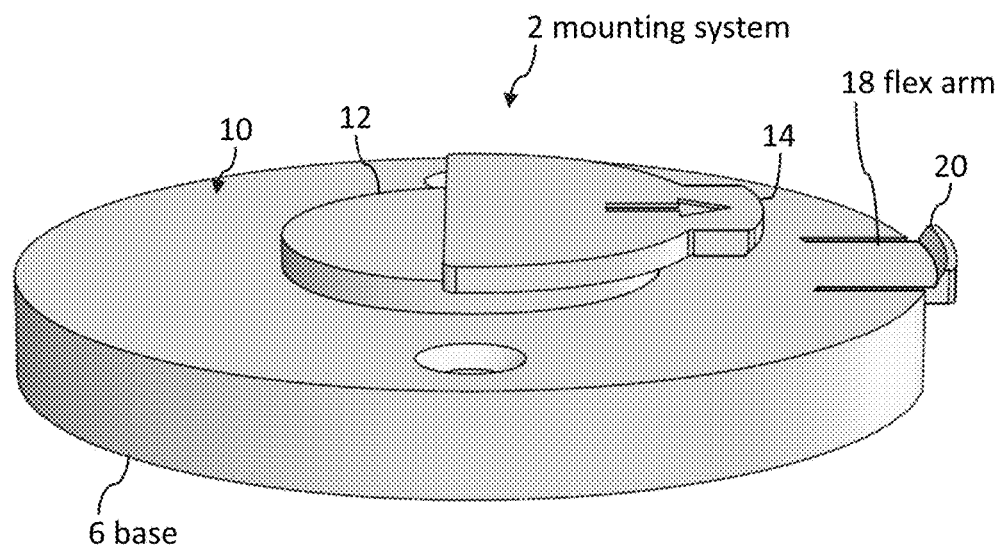
FIG. 9 illustrates a side and top perspective view of the mounting system, according to some embodiments.

FIG. 1 illustrates a perspective view of a camera system 4 coupled to a mounting system 2. The mounting system 2 can be used to couple the camera system 4 to an object 39 such as a wall or tripod (e.g., as illustrated in FIG. 8). The camera system 4 can be an Echo Look made by Amazon.com, Inc. or any other camera such as a Nest Cam made by Nest Labs, Inc. The camera system 4 can include more than just the camera itself. For example, the camera system 4 can include a stand 36. Many different types of stands 36 can be used. For example, many camera systems made by Next Labs, Inc. include stands.

Figures 2, 3:
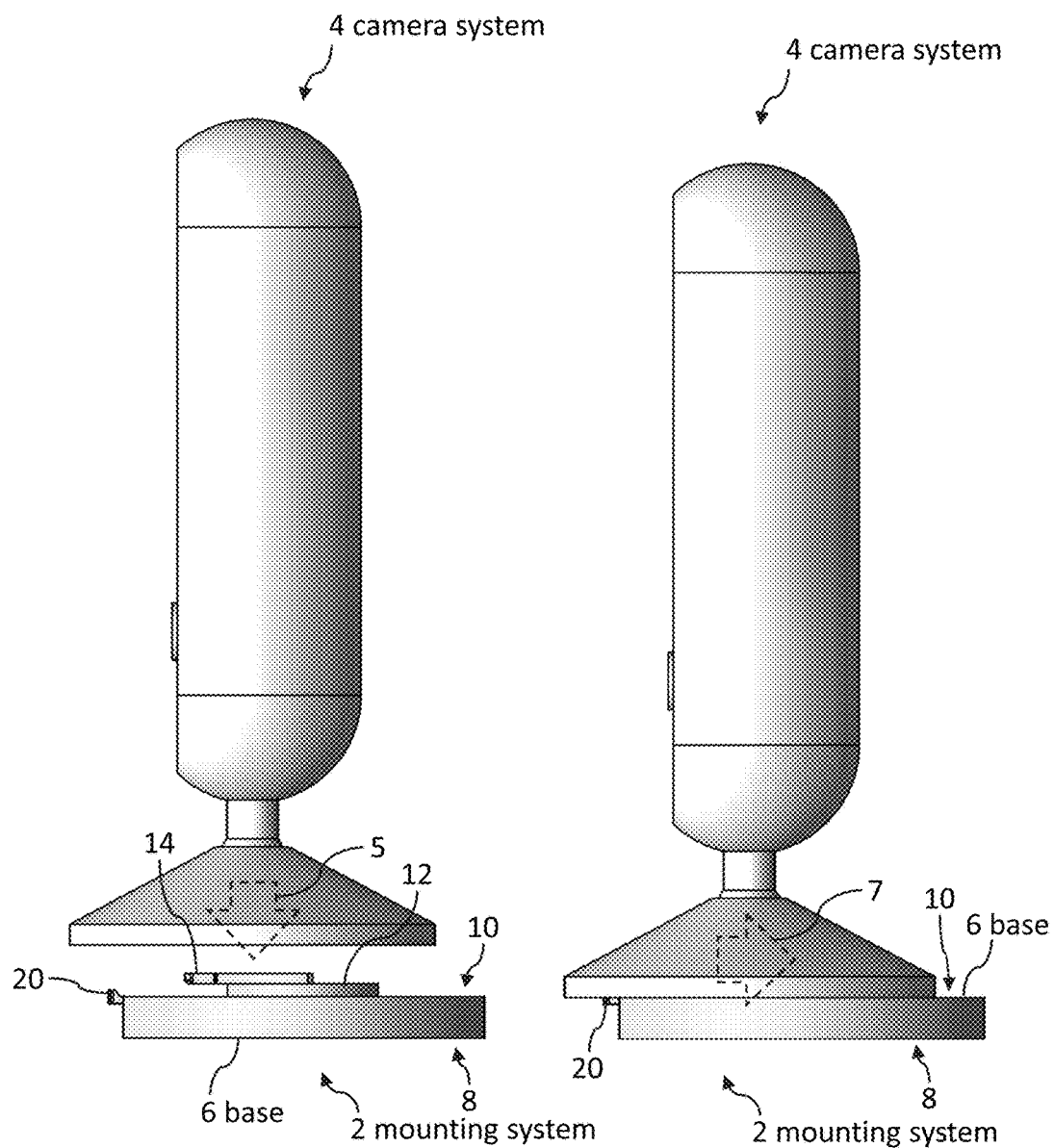
FIGS. 2-4 illustrate side views of the camera system and the mounting system, according to some embodiments.

FIG. 2 illustrates a side view of the camera system 4 as the camera system 4 is moved downward towards the mounting system 2 (as indicated by arrow 5). FIG. 3 illustrates a side view of the camera system 4 as the camera system 4 is moved horizontally to center the camera system 4 onto the mounting system 2 (as indicated by arrow 7).

In some embodiments, pressing the camera system 4 onto the mounting system 2 causes the flex arm 18 to bend inwards (e.g., downwards in the orientation shown in FIGS. 2 and 3) such that the retention lip 20 moves inwards to allow the camera system 4 to slide into place on the mounting system 2. Once the camera system 4 is slid into place on the mounting system 2, the camera system 4 no longer pressed the flex arm 18 inward. As a result, the flex arm 18 springs back into a neutral position of the flex arm 18, which positions the retention lip 20 to impede the camera system 4 from dislodging from the mounting system 2 (e.g., the retention lip 20 impedes the camera system 4 from moving to the left relative to the mounting system 2 in the configuration illustrated in FIG. 4).

Figure 4:
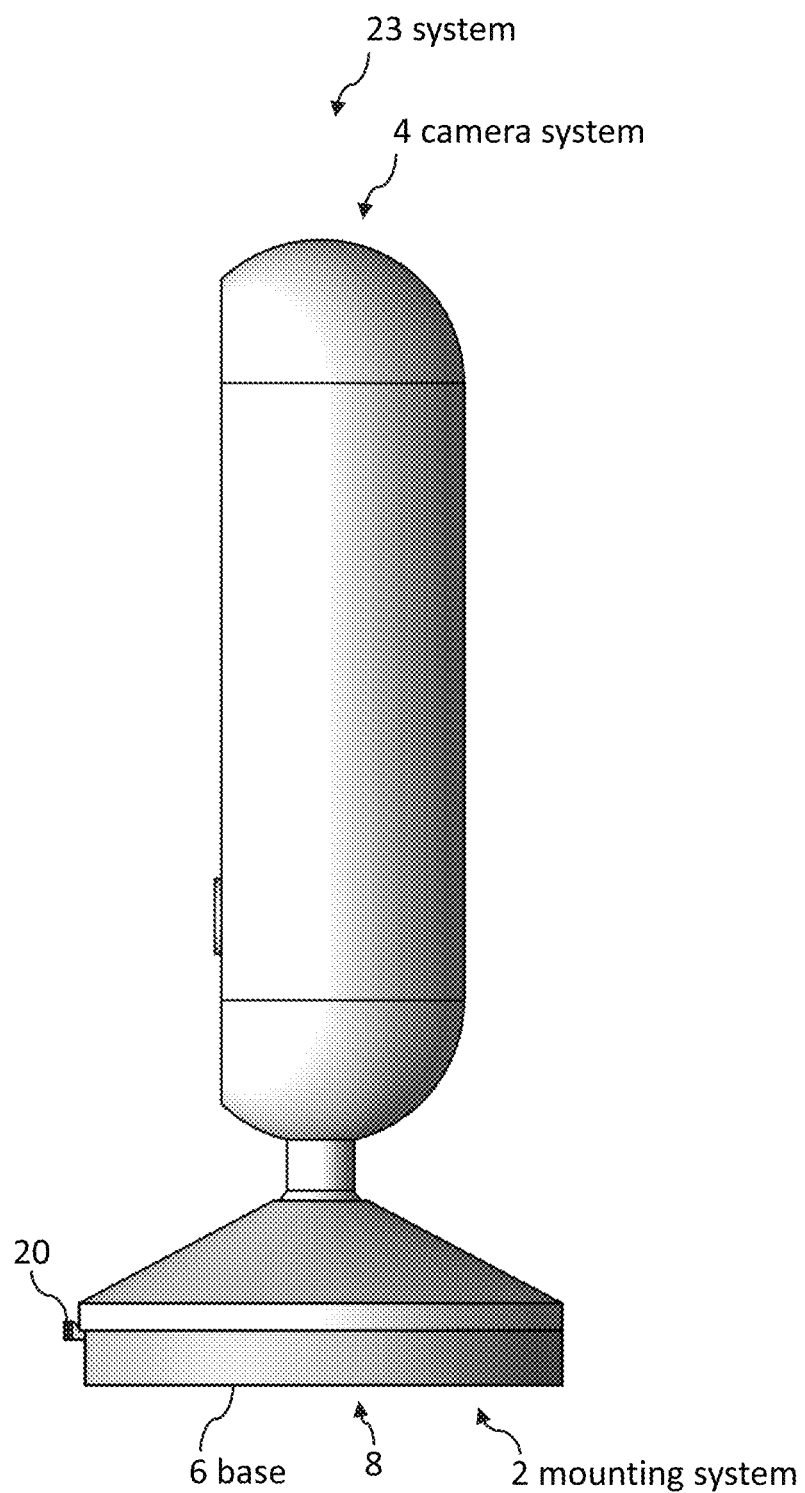
Figure 5:
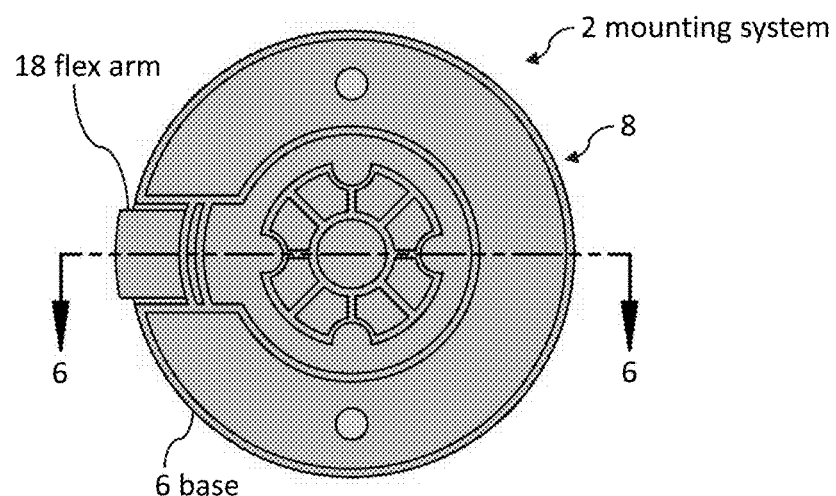
FIG. 5 illustrates a bottom view of the mounting system, according to some embodiments.

FIG. 4 illustrates a side view of the camera system 4 coupled to the mounting system 2 with the flex arm 18 in a neutral position and the retention lip 20 helping to secure the camera system 4 to the mounting system 2.

The user can press the retention lip 20 and/or the flex arm 18 inward (e.g., downward in the orientation illustrated in FIG. 4) to move the retention lip 20 out of an uncoupling path of the system 23 such that the retention lip 20 no longer impedes uncoupling the camera system 4 from the mounting system 2.

Some embodiments comprise a mounting system 2 for a camera system 4. In some embodiments, a mounting system 2 comprises a base 6 configured to couple the camera system 4 to an object (e.g., a wall, a tripod) that supports the camera system 4, wherein the base 6 comprises an outward side 10 and an inward side 8.

Unless otherwise indicated herein, as used herein "supports" is used in a broad sense to mean to hold up, prop up, or serve as a foundation for an item such as a camera system.

Figure 7:
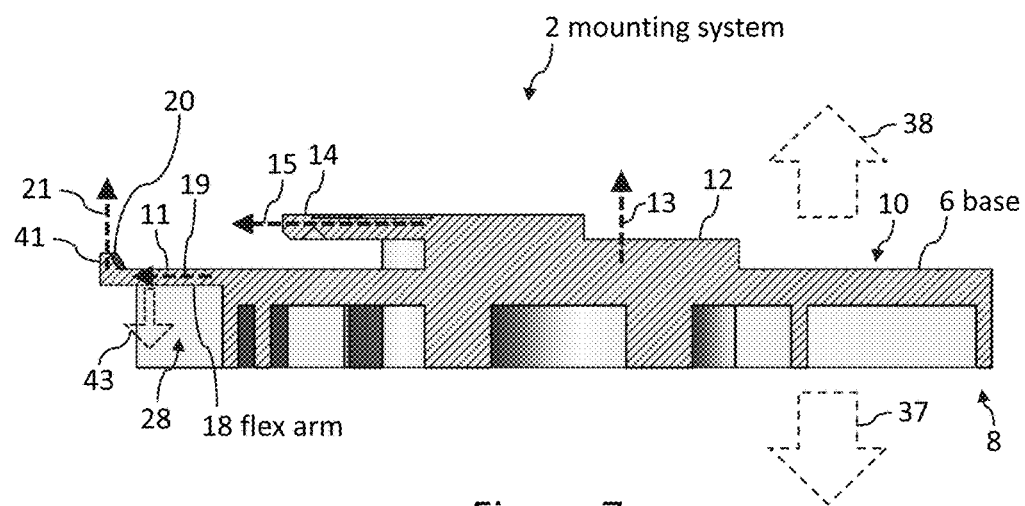
FIG. 7 illustrates the same cross-sectional view shown in FIG. 6 except that the camera system is hidden, according to some embodiments.

FIGS. 7 and 8 include arrows to indicate inward and outward directions. Arrow 37 indicates an inward direction. Arrow 38 indicates an outward direction 38. Unless otherwise indicated herein, "inward" is used in a broad sense to mean a direction towards an object 39 to which the mounting system 2 couples the camera system 4. A mounting system 2 can comprise an inward side even if the mounting system 2 is not yet coupled to an object 39 used to support the camera system 4. For example, a mounting system 2 can be configured to couple a camera system 4 to an object 39 even if the object 39 is not yet present. The side configured to face the object 39 is the inward side even if the object is not yet present.

Unless otherwise indicated herein, "outward" is used in a broad sense to mean a direction away from the object 39 to which the mounting system 2 couples the camera system 4. The side configured to face away from the object 39 is the outward side even if the object is not yet present.

In several embodiments, a mounting system 2 comprises a first protrusion 12 that protrudes away from the base 6 in a first direction 13 and a second protrusion 14 coupled to the base 6 by the first protrusion 12. The second protrusion 14 can protrude away from the first protrusion 12 in a second direction 15 that is within plus or minus thirty degrees (and/or within plus or minus fifteen degrees) of perpendicular to the first direction 13.

In some embodiments, a mounting system 2 comprises a flex arm 18 coupled to the base 6 and a retention lip 20 coupled to the base 6 by the flex arm 18. The retention lip 20 can protrude in a third direction 21 that is within plus or minus thirty degrees of parallel to the first direction 13 (and/or within plus or minus fifteen degrees of parallel to the first direction 13). The flex arm 18 can be configured to enable the retention lip 20 to move inward (e.g., bend inward along an arc) to facilitate coupling the camera system 4 to the mounting system 2. Arrow 43 in FIG. 7 illustrates a direction in which the flex arm 18 can bend inward.

Figure 6:
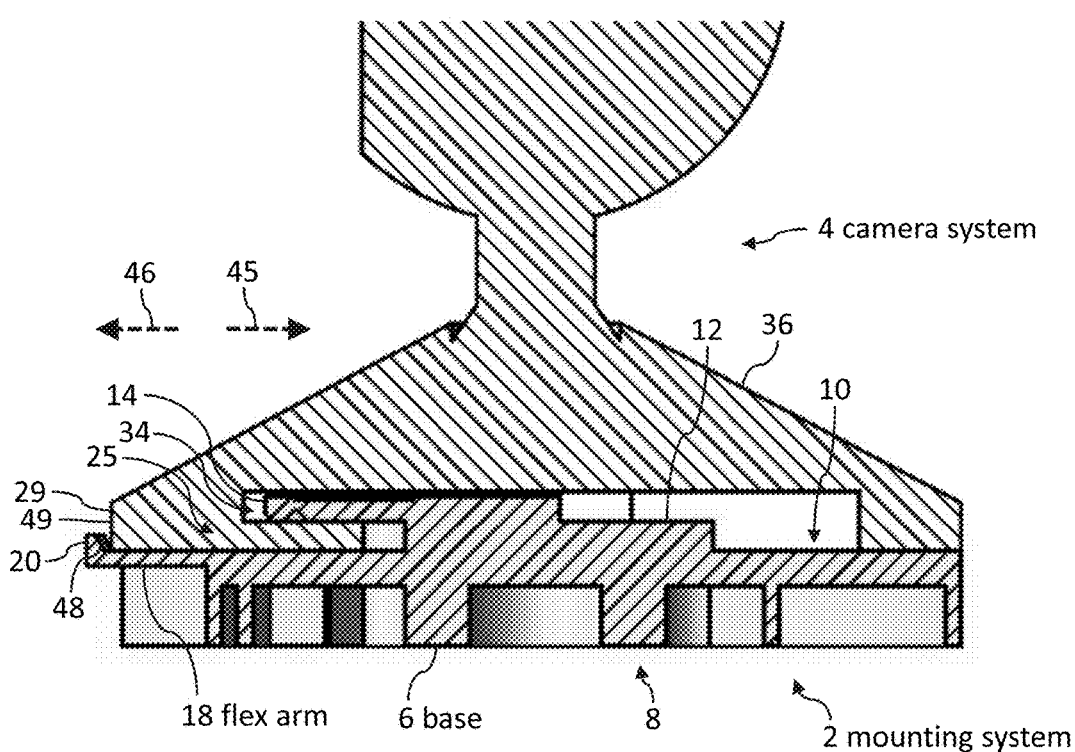
FIG. 6 illustrates a cross-sectional view taken along line 6-6 shown in FIG. 5 of a portion of the camera system coupled to the mounting system, according to some embodiments.

In several embodiments, at least a portion 25 of the camera system 4 is secured between the first protrusion 12, the second protrusion 14, the flex arm 18, and the retention lip 20 (e.g., as illustrated in FIG. 6).

Referring now to FIGS. 7 and 8, the flex arm 18 protrudes away from the first protrusion 12 in a fourth direction 19 that is within plus or minus thirty degrees of parallel to the second direction 15 (e.g., as illustrated in FIG. 7). The second protrusion 14 is located farther outward than the flex arm 18 and the retention lip 20.

The base 6 comprises an open area 28 in which at least a portion of the flex arm 18 is located. The open area 28 is configured to enable the flex arm 18 to bend inward until an outermost portion of the retention lip 20 is located inward relative to the outward side 10 of the base 6 without any portion of the flex arm 18 being located inward relative to the inward side 8 of the base 6.

The outward side 11 of the flex arm 18 is within one millimeter of being coplanar with the outward side 10 of the base 6, an outermost portion of the retention lip 20 is located farther outward than the outward side 10 of the base 6, and the outermost portion of the retention lip 20 is located farther inward than an outermost portion of the second protrusion 14.

A distal-most portion 41 the retention lip 20 is located farther radially (and/or farther from a center of the base 6) than a distal-most portion of the second protrusion 14. The distal-most portion 41 the retention lip 20 is located farther radially (and/or farther from a center of the base 6) than an outer perimeter 27 of the base 6. As used herein, "distal" is used broadly to mean situated away from the point of attachment. As used herein, "radially" is used broadly to mean measured along a radius.

Some embodiments comprise a camera system 4. As illustrated in FIG. 6, the second protrusion 14 can be located within a cavity 34 of the camera system 4. The camera system 4 can comprise a detachable stand 36 having an outer perimeter 29. The retention lip 20 is located farther radially than the outer perimeter 29 of the stand 36 such that at least one of the first protrusion 12 and the second protrusion 14 impede the camera from sliding off the base 6 in a fifth direction 45 (e.g., to the right in the orientation illustrated in FIG. 6) and the retention lip 20 impedes the camera from sliding off the base 6 in a sixth direction 46 (e.g., to the left in the orientation illustrated in FIG. 6). The sixth direction 46 is opposite relative to the fifth direction 45.

The retention lip 20 comprises a slanted surface 48 that faces towards an adjoining surface 49 of the stand 36. The slanted surface 48 is configured such that pushing the adjoining surface 49 towards the slanted surface 48 causes the flex arm 18 to bend inward to enable the camera system 4 to decouple from the mounting system 2.

The retention lip 20 is located farther radially than the outer perimeter 29 such that the retention lip 20 is configured to enable a user to push the retention lip 20 inward to bend the flex arm 18 to move the retention lip 20 out of an uncoupling path of the mounting system 2 to enable the user to uncouple the camera system 4 from the mounting system 2.

Figure 10:
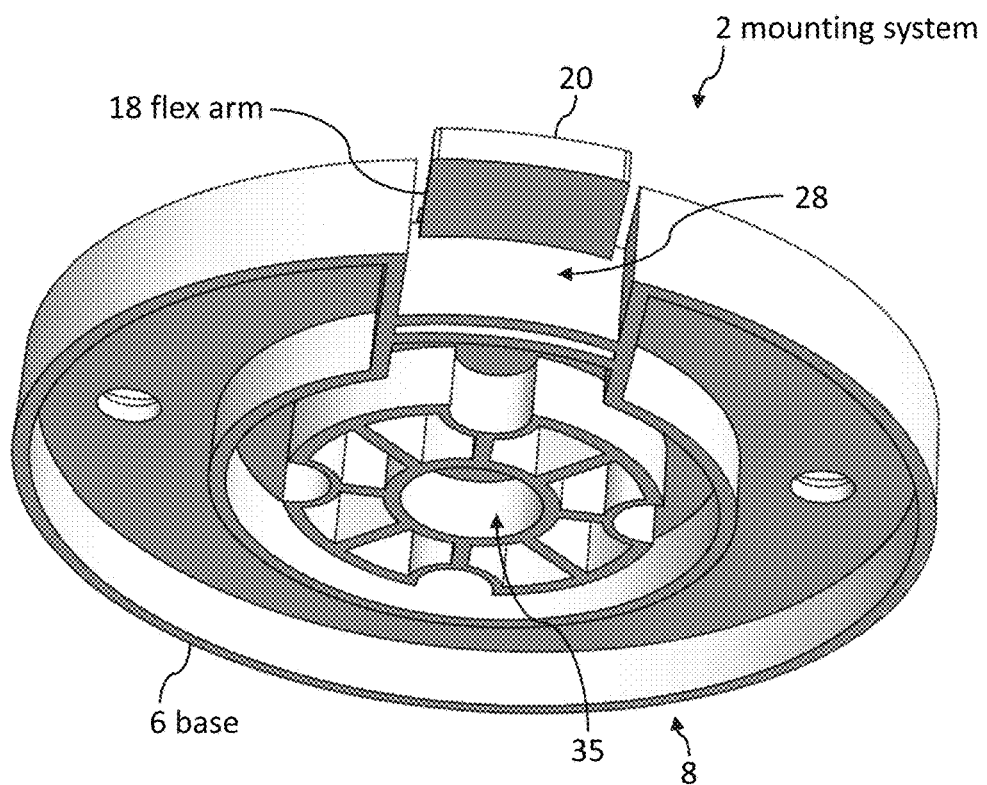
FIG. 10 illustrates a front and bottom perspective view of the mounting system, according to some embodiments.
Figure 11:
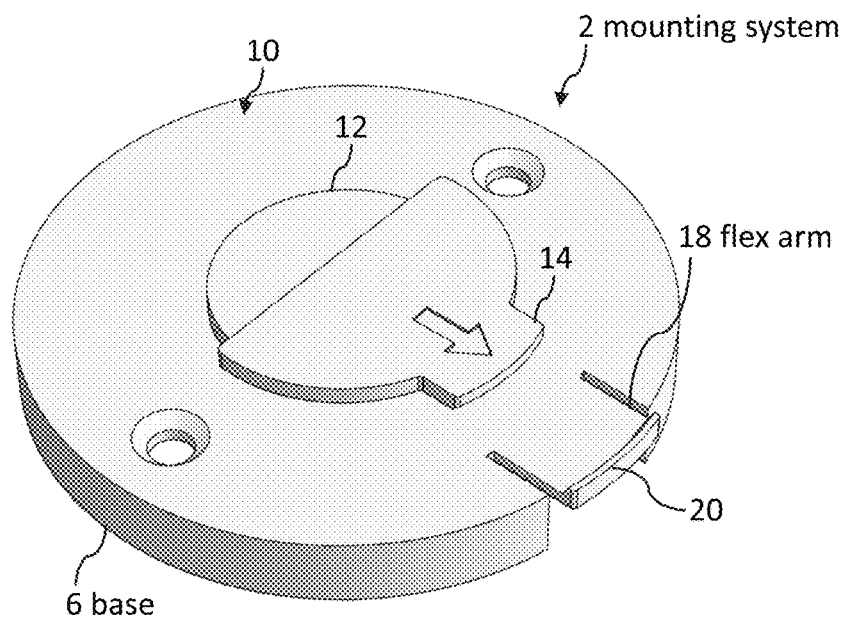
FIG. 11 illustrates a front, top, and side perspective view of the mounting system, according to some embodiments.

FIG. 10 illustrates a front and bottom perspective view of the mounting system 2, which can include a cavity 35 configured to insert a metal (e.g., stainless steel) threaded insert. The threaded insert can have a female threaded portion oriented to enable inserting a male threaded end of a tripod or other camera holding system. In some embodiments, a metal insert is insert molded such that plastic flows around portions of the metal insert during the molding process of the part shown in FIG. 10. Many types of threads can be used when manufacturing the threaded insert. For example, the threads can be compatible with common tripod threaded portions to enable coupling the mounting system 2 to a tripod.

Figure 12:
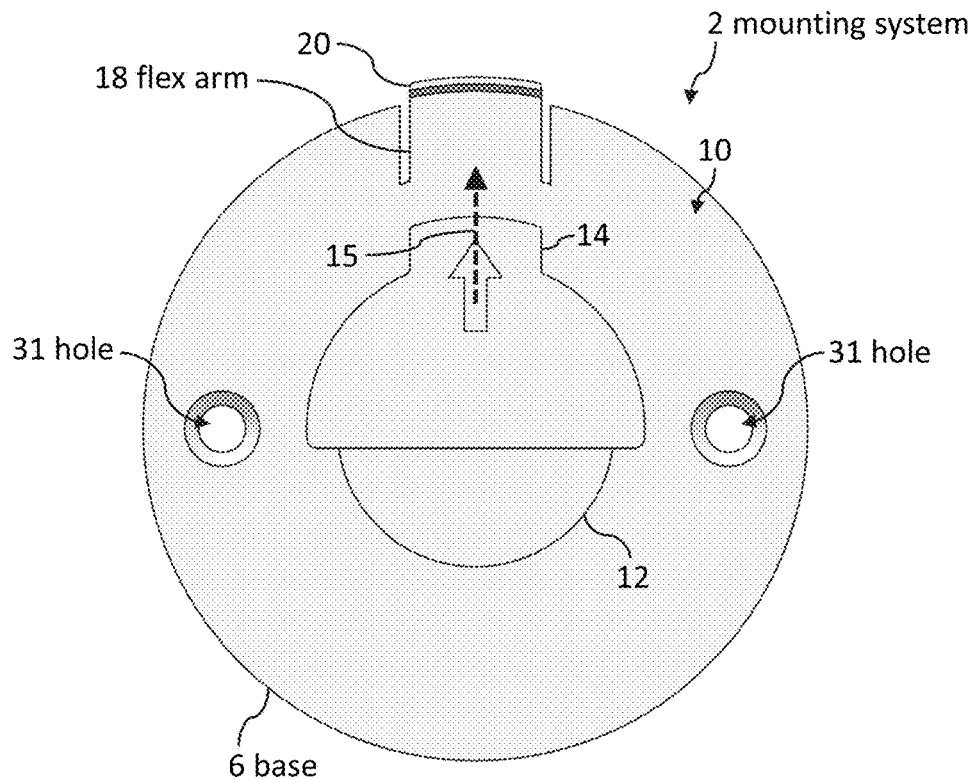
FIG. 12 illustrates a top view of the mounting system, according to some embodiments.

FIG. 12 illustrates screw holes 31. A user can insert screws through the holes 31 to couple the mounting system 2 to a wall or other surface.

Some embodiments are molded from acrylonitrile butadiene styrene ("ABS"), thermoplastic elastomer ("TPE"), thermoplastic polyurethane ("TPU"), polyurethane ("PU"), and/or polycarbonate ("PC"). In several embodiments, a first material is molded, and then a softer material is overmolded onto the first material. For example, the outer material of mounts can be softer than the inner material. In several embodiments, ribs are overmolded from a softer material than is used to mold other portions of the mounts. Some embodiments can be molded from silicone.

Textures and surface features (such as ridges) can be molded into external surfaces of mounts to make mounts less likely to slip out of people's hands. The mounts can have any suitable thickness. In some embodiments, the mount's walls are at least 0.5 millimeters thick and/or less than 15 millimeters thick.

Figure 13:
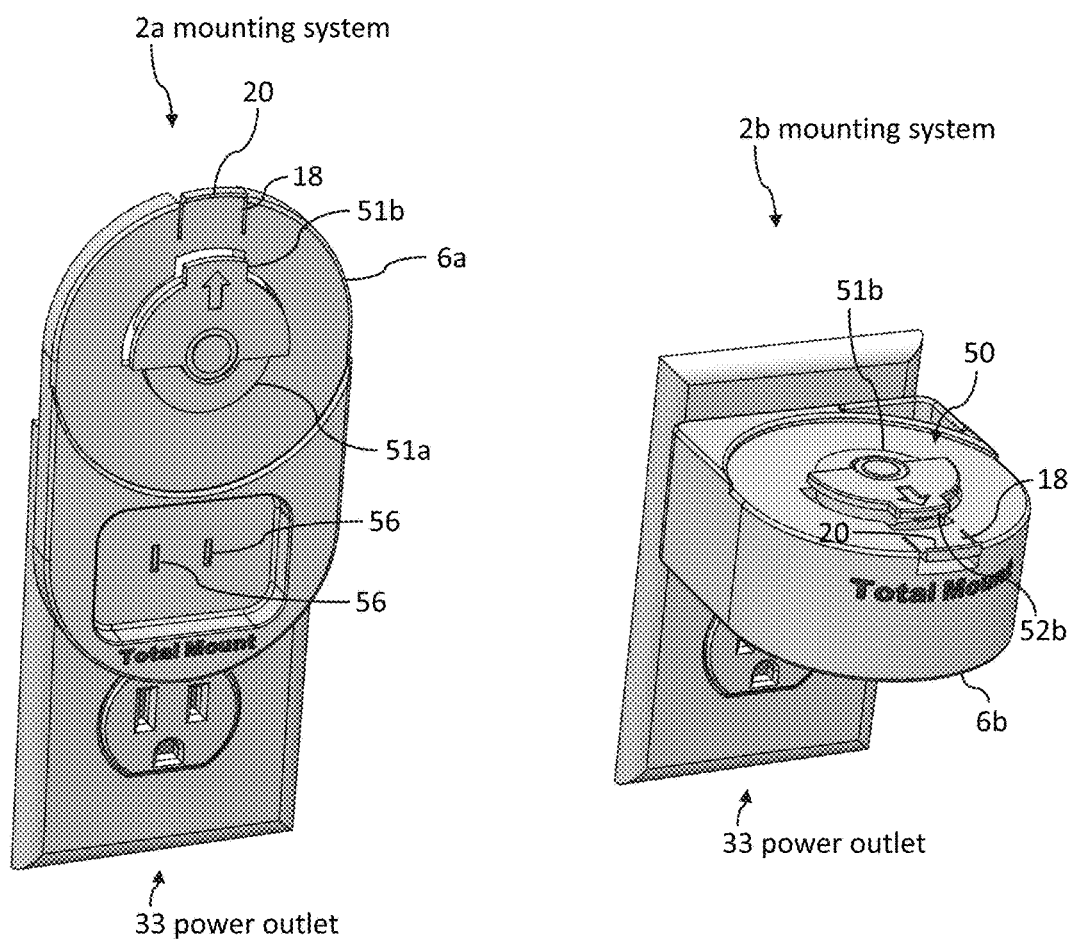
FIG. 13 illustrates a perspective view of mounting systems coupled to power outlets, according to some embodiments.
Figure 14:
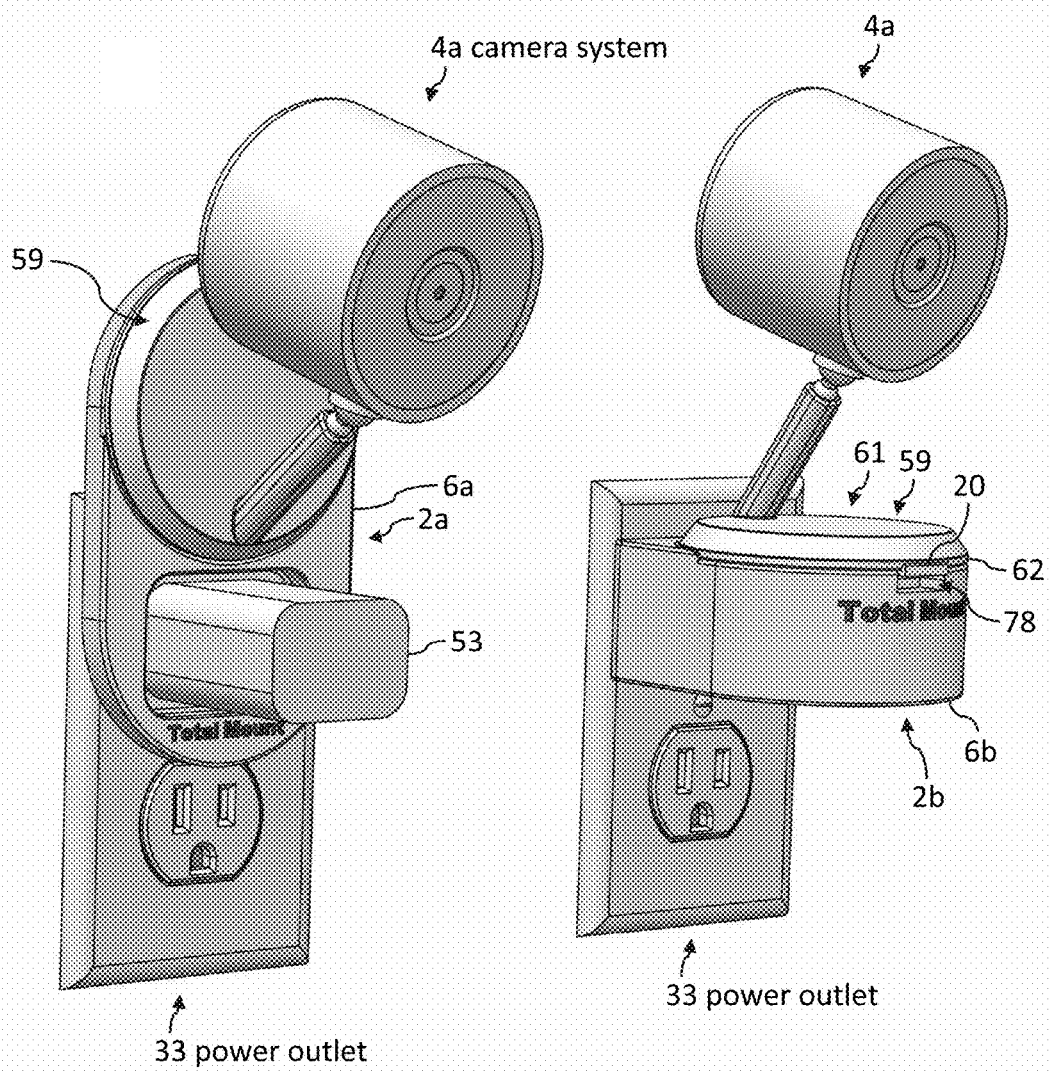
FIG. 14 illustrates a perspective view of cameras coupled to power outlets, according to some embodiments.
Figure 15:
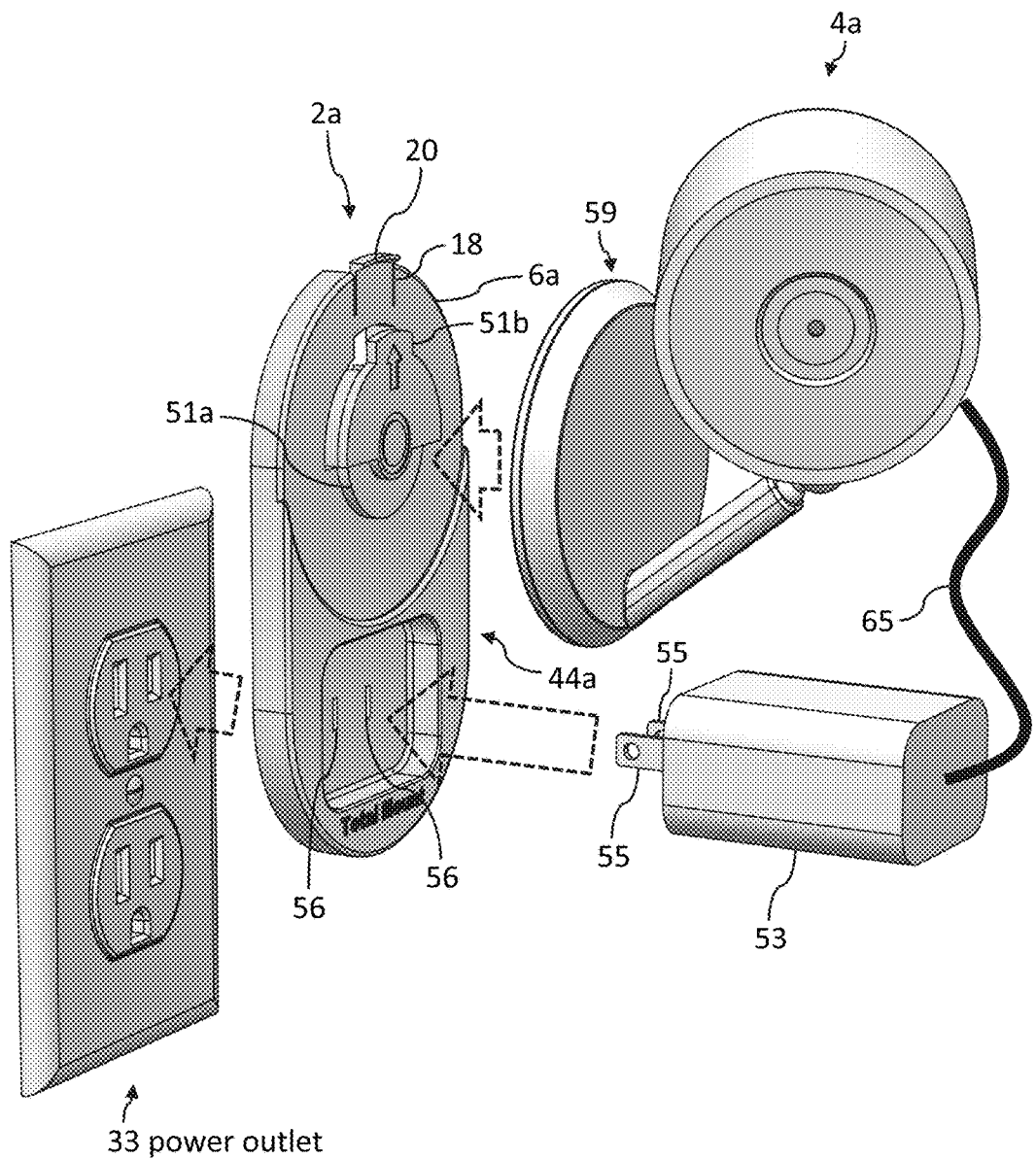
FIGS. 15 and 16 illustrate perspective views with arrows to generally indicate how various components can be assembled, according to some embodiments.
Figure 16:
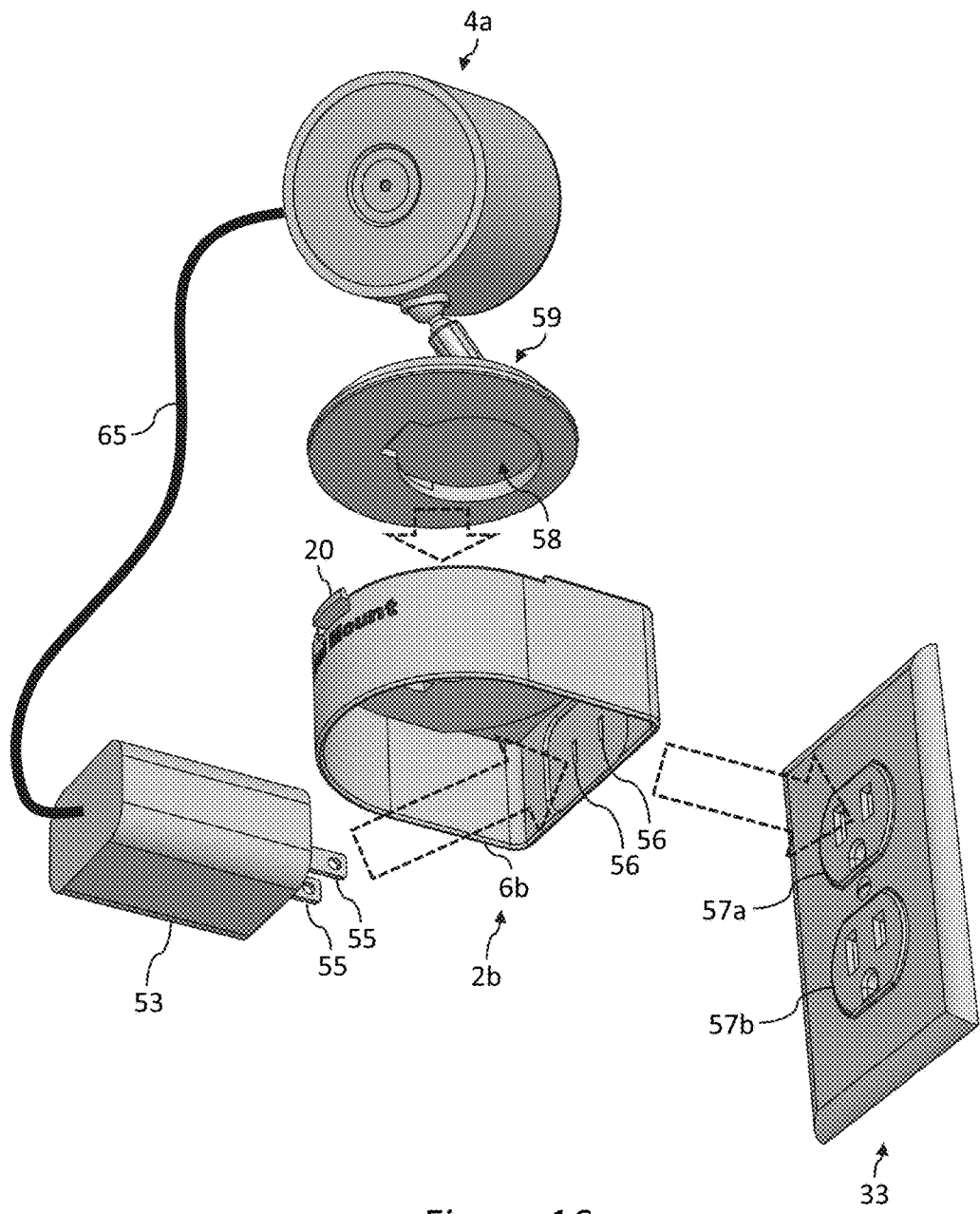

Mounting system can be used to couple a camera system to a power outlet. FIG. 13 illustrates a perspective view of mounting systems coupled to power outlets. The camera systems are hidden in FIG. 13 to increase the clarity of other components. The camera systems are visible in the perspective view of FIG. 14. FIGS. 15 and 16 illustrate perspective views with arrows to generally indicate how various components can be assembled.

Figure 18B:
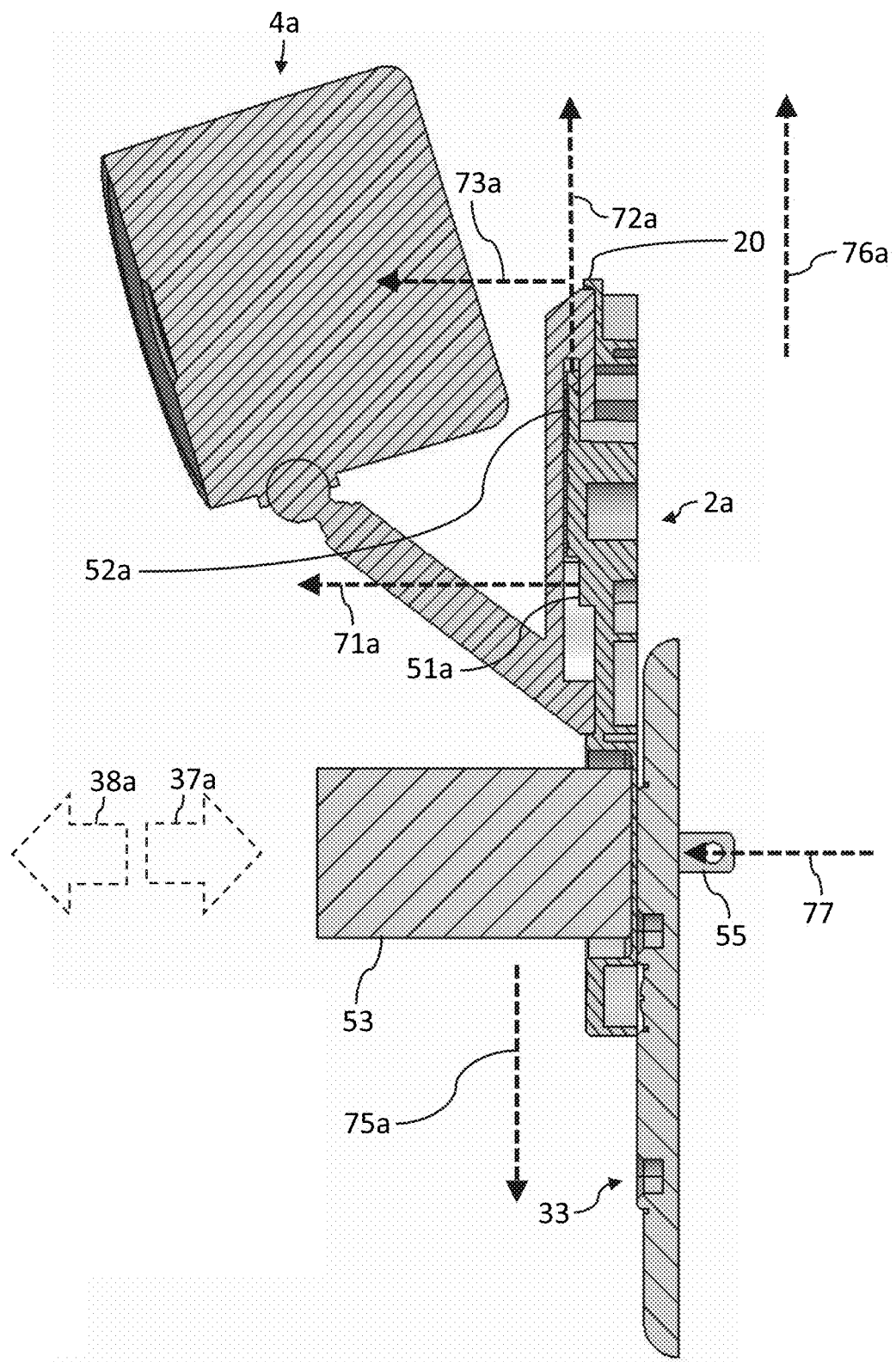

FIG. 17 illustrates a front view of a system. FIG. 18A illustrates a cross-sectional view taken along line 18 of FIG. 17. The prongs are electrically coupled to a building. The electrical system of the building is hidden to increase the clarity of the prongs. FIG. 18B is identical to FIG. 18A except that different items are labeled to help increase the clarity of certain items in each of these figures.

Figures 19, 20:
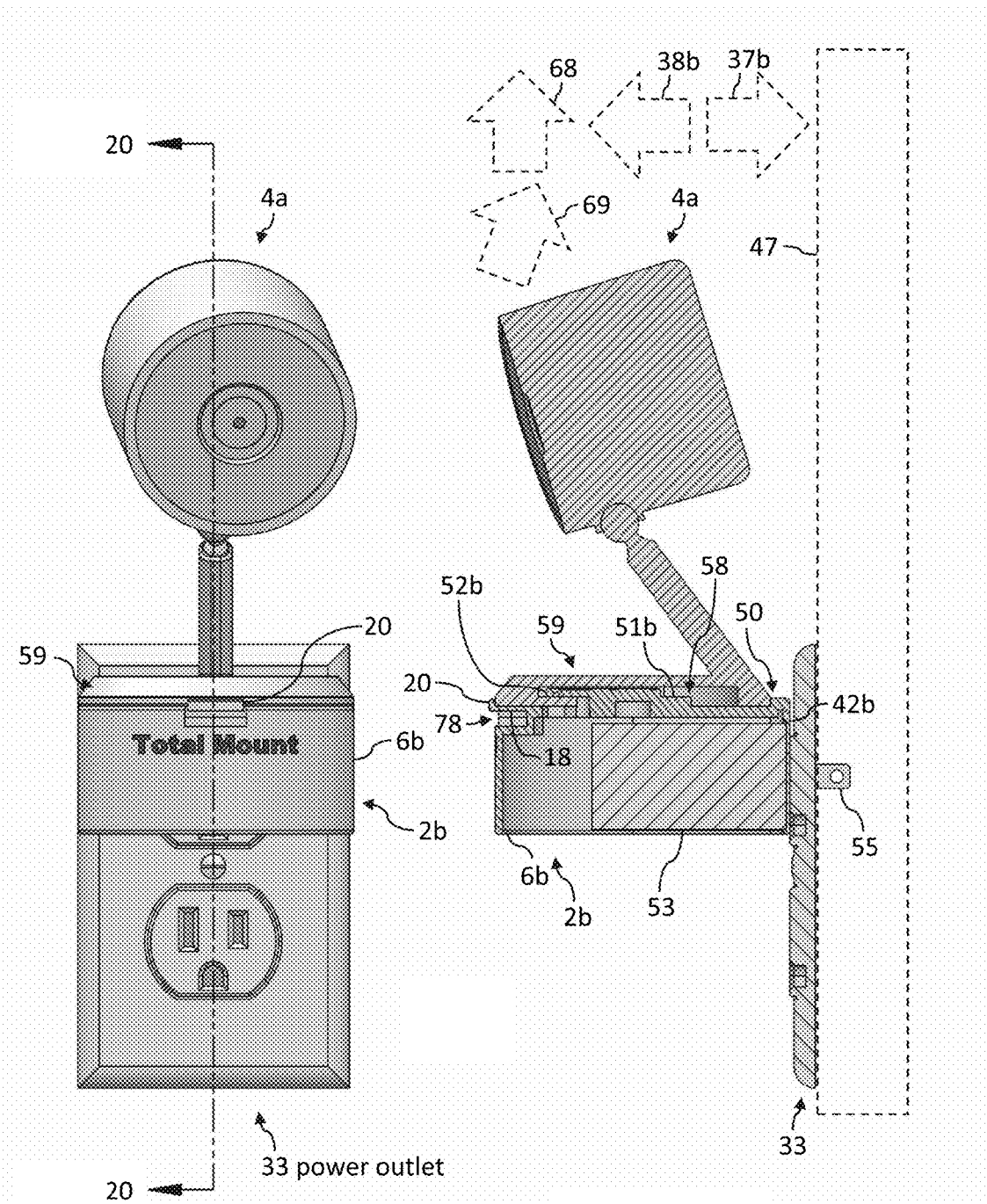
FIG. 19 illustrates a front view of a system, according to some embodiments.
FIG. 20 illustrates a cross-sectional view taken along line 20 from FIG. 19, according to some embodiments.
Figure 21:
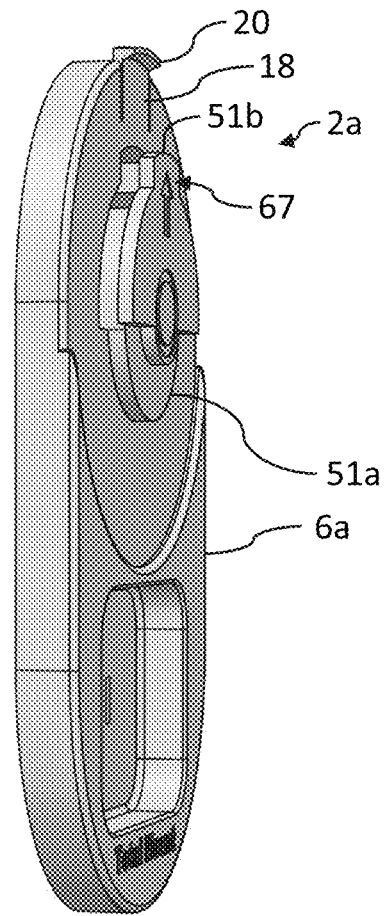
FIGS. 21-24 illustrate perspective views of mounting systems, according to some embodiments.
Figure 22:
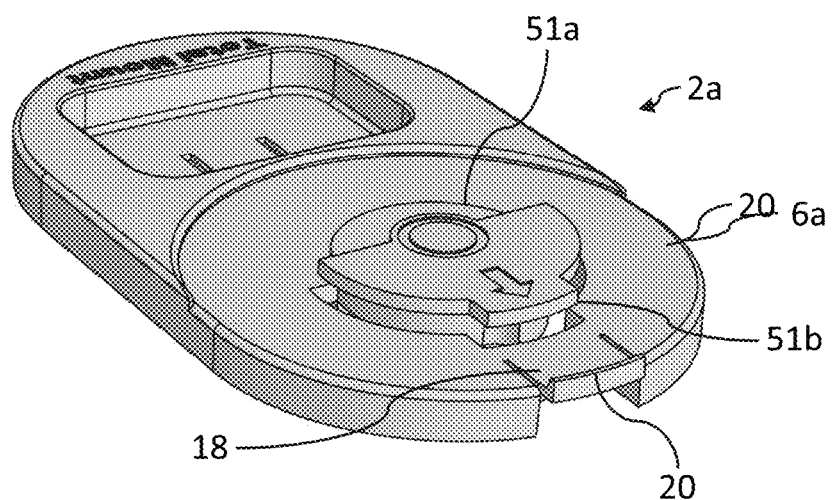
Figure 23:
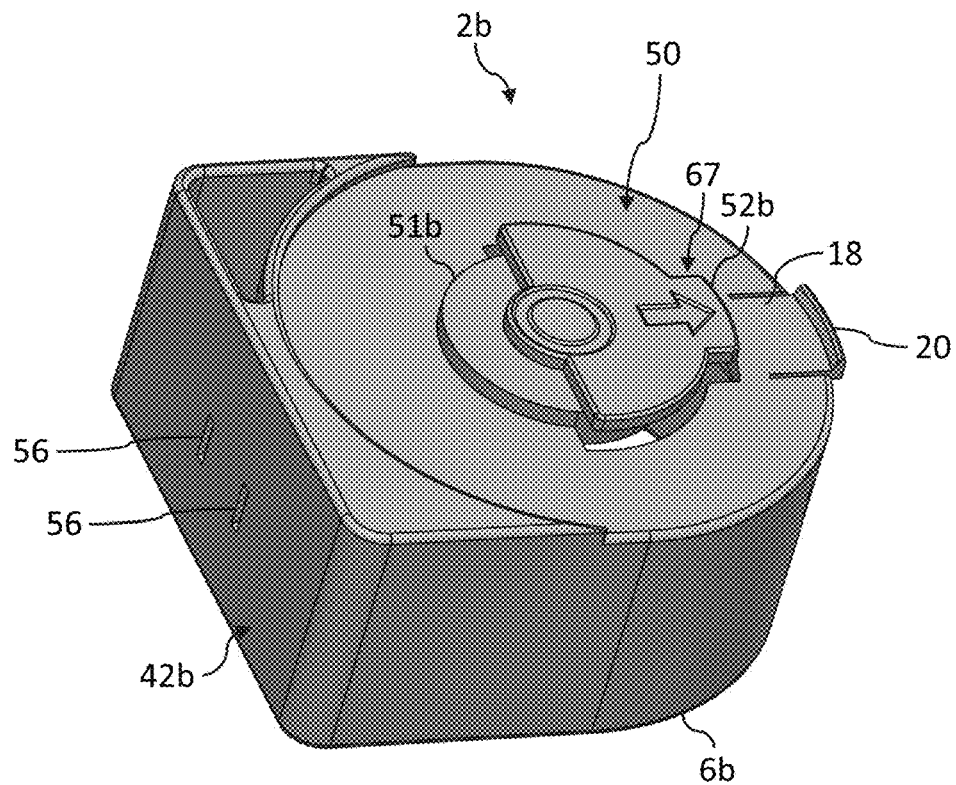
Figure 24:
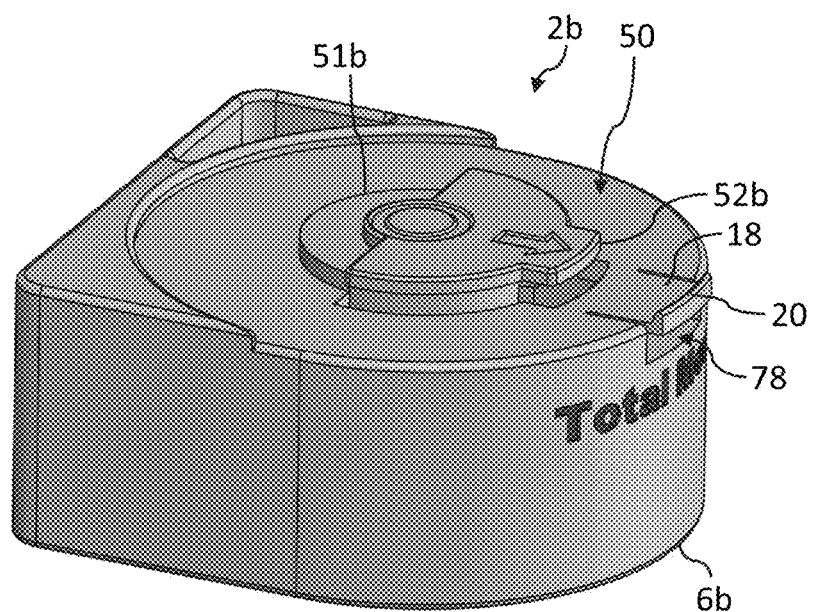

FIG. 19 illustrates a front view of a system. FIG. 20 illustrates a cross-sectional view taken along line 20 of FIG. 19. The prongs are electrically coupled to a building. The electrical system of the building is hidden to increase the clarity of the prongs.

FIGS. 21-24 illustrate perspective views of mounting systems. The mounting systems illustrated in FIGS. 21-24 can have all of the flex arm and retention lip features described in the context of FIGS. 1-12.

Referring now primarily to FIGS. 13, 14, 15, 17, 18A, 18B, 21 and 22, some embodiments comprise a mounting system 2a for a camera system 4a. Many different types of camera system 4as can be mounted with the mounting system 2a. Some camera system 4as include a camera and a stand 61 configured to hold the camera up and help orient the camera. The camera system 4a can also include wireless communication (e.g., WiFi and/or cellular systems) to enable the camera to send videos and recorded audio to remote locations and/or to enable the camera to receive audio. The camera system 4a can be Amazon.com's Echo Look, Amazon.com's Cloud Cam, or any other camera system.

In several embodiments, mounting system 2as comprise a first base 6a configured to couple the camera system 4a to a power outlet 33. The power outlet 33 can be coupled to any type of wall including a cabinet wall, a kitchen's backsplash wall, a drywall, etc.

The first base 6a can comprise an inward side 42a configured to face towards a wall 47 of a building to which the power outlet 33 can be coupled and an outward side 44a configured to face away from the wall. Mounting system 2as can comprise a first protrusion 51a that protrudes outward from the first base 6a in a first direction 71a; and a second protrusion 52a 52a coupled to the first base 6a by the first protrusion 51a. The second protrusion 52a can protrude away from the first protrusion 51a in a second direction 72a that is within plus or minus thirty degrees of perpendicular to the first direction 71a. The second protrusion 52a can be configured to removably secure the camera system 4a to the first base 6a.

FIG. 18 include arrows to indicate inward and outward directions. Arrow 37a indicates an inward direction. Arrow 38a indicates an outward direction. Unless otherwise indicated herein, "inward" is used in a broad sense to mean a direction towards an object 47, 33 to which the mounting system 2a couples the camera system 4a. A mounting system 2a can comprise an inward side even if the mounting system 2a is not yet coupled to an object 47, 33 used to support the camera system 4a. For example, a mounting system 2a can be configured to couple a camera system 4a to an object 47, 33 even if the object 47, 33 is not yet present. The side configured to face the object 47, 33 is the inward side even if the object is not yet present.

In some embodiments, the camera system 4a comprises a plug 53 configured to receive electricity from a power outlet 33. An electrical cable 65 can couple the plug 53 to the camera system 4a. (The cable 65 is not shown in all the figures to increase the clarity of other features.) The first base 6a can couple the camera system 4a to the power outlet 33. The plug 53 can comprise at least one metal power prong 55 configured to electrically couple the plug 53 to the power outlet 33. The first base 6a can comprise at least one hole 56 oriented towards the power outlet 33. The power prong 55 can be located at least partially in the hole 56 and at least partially in the power outlet 33 such that the plug 53 is adapted to secure the first base 6a to the power outlet 33.

In several embodiments, the hole 56 comprises a central axis that is oriented within plus or minus thirty degrees of parallel to the first direction 71a (e.g., as indicated by arrow 77 in FIG. 18b). The first protrusion 51a can be cylindrical. The second protrusion 52a can comprise a cantilever beam located in a cavity 58 of the camera system 4a to help secure the camera system 4a to the power outlet 33.

In some embodiments, the first direction 71a is within plus or minus thirty degrees of being directly outward (e.g., perpendicular to the wall), and the second direction 72a is within plus or minus thirty degrees of at least one of vertically upward and vertically downward.

In several embodiments, the first direction 71a is within plus or minus twenty degrees of being directly outward (e.g., perpendicular to the wall), and the second direction 72a is within plus or minus twenty degrees of horizontal. For example, the mount can be position horizontally (rather than vertically as illustrated in FIG. 17).

In some embodiments, the mounting system 2a comprises the camera system 4a. The camera system 4a can comprise a second base 59 having a cavity 58. The second base 59 of the camera system 4a can be coupled to the first base 6a by the first protrusion 51a and the second protrusion 52a. At least a portion of the first protrusion 51a and a portion of the second protrusion 52a can be located in the cavity 58. At least a portion of the camera system 4a can be secured between the second protrusion 52a and the first base 6a such that the first base 6a couples the camera system 4a to the power outlet 33.

In several embodiments, the mounting system 2a comprises a flex arm 18 coupled to the first base 6a, and a retention lip 20 coupled to the first base 6a by the flex arm 18. The flex arm 18 is configured to bend to enable coupling and uncoupling the camera system 4a to at least a portion of the mounting system 2a. The flex arm 18 can be configured to removably secure the camera system 4a to the first base 6a. The retention lip 20 can protrude in a third direction 73a that is within plus or minus forty degrees of parallel to the first direction 71a. The flex arm 18 can comprise a cantilever beam configured to bend to enable the retention lip 20 to move inward to facilitate coupling the camera system 4a to the mounting system 2a.

In some embodiments, the mounting system 2a comprises a flex arm 18 coupled to the first base 6a, and a retention lip 20 coupled to the first base 6a by the flex arm 18. The flex arm 18 can be configured to enable the retention lip 20 to move inward to facilitate coupling the camera system 4a to the mounting system 2a. The retention lip 20 can be configured to impede uncoupling the camera system 4a from the mounting system 2a until the flex arm 18 is bent inward. The second protrusion 52a can be located farther outward than the flex arm 18 and the retention lip 20 (e.g., even though the second protrusion 52a, the flex arm 18, and the retention lip 20 are not aligned such that they are located in series in an outward direction). The retention lip 20 can be a protrusion configured to impede uncoupling the camera base from the mounting system 2a. Moving the retention lip 20 (e.g., by bending the flex arm 18) can permit uncoupling the camera base from the mounting system 2a.

In several embodiments, the mounting system 2a comprises a camera system 4a, a flex arm 18 coupled to the first base 6a, and a retention lip 20 coupled to the first base 6a by the flex arm 18. The second protrusion 52a can be located within a cavity 58 of the camera system 4a. The camera system 4a can comprise a stand 61 having an outer perimeter 62. The retention lip 20 can be located farther radially than the outer perimeter 62 of the stand 61 such that at least one of the first protrusion 51a and the second protrusion 52a impede the camera system 4a from sliding off the first base 6a in a fifth direction 75a and the retention lip 20 impedes the camera system 4a from sliding off the first base 6a in a sixth direction 76a that is opposite the fifth direction 75a.

Referring now primarily to FIGS. 13, 14, 16, 19, 20, 23, and 24, several embodiments comprise a mounting system 2b adapted to mount a camera system 4a to a power outlet 33. Mounting systems 2b can comprise a first base 6b configured to couple the camera system 4a to a power outlet 33, wherein the first base 6b comprises an inward side 42b configured to face towards a wall 47 of a building to which the power outlet 33 can be coupled and an upward side 50 oriented within plus or minus twenty degrees of perpendicular to the inward side; a first protrusion 51b that protrudes upward from the first base 6b in a first direction; and a second protrusion 52b coupled to the first base 6b by the first protrusion 51b. The second protrusion 52b can protrude away from the first protrusion 51b in a second direction that is within plus or minus thirty degrees of perpendicular to the first direction. The second protrusion 52b can be configured to removably secure the camera system 4a to the first base 6b.

FIG. 20 include arrows to indicate inward and outward directions. Arrow 37b indicates an inward direction. Arrow 38b indicates an outward direction. Unless otherwise indicated herein, "inward" is used in a broad sense to mean a direction towards an object 47, 33 to which the mounting system 2b couples the camera system 4a. A mounting system 2b can comprise an inward side even if the mounting system 2b is not yet coupled to an object 47, 33 used to support the mounting system 2b. For example, a mounting system 2b can be configured to couple a camera system 4a to an object 47, 33 even if the object 47, 33 is not yet present. The side configured to face the object 47, 33 is the inward side even if the object 47, 33 is not yet present.

Unless otherwise indicated herein, "directly upward" is used in a broad sense to mean a direction that is perpendicular to inward. A direction can be upward even if the direction is not directly upward. For example, in FIG. 20, arrow 68 is oriented directly upward, and arrow 69 is oriented upward, but not directly upward because it is not perpendicular to inward arrow 37b. Unless otherwise indicated herein, "downward" is a direction that is opposite relative to "upward."

In some embodiments, the mounting system 2b comprises the camera system 4a, which can have a plug 53 configured to receive electricity from a power outlet 33. An electrical cable 65 can electrically and mechanically couple the plug 53 to the camera system 4a. The plug 53 can comprise at least one power prong 55 that electrically and mechanically couples the plug 53 to the power outlet 33. The first base 6b can comprise at least one hole 56 oriented towards the power outlet 33. The power prong 55 can be located partially in the hole 56 and partially in the power outlet 33 such that the plug 53 is adapted to secure the first base 6b to the power outlet 33.

In several embodiments, the hole 56 comprises a central axis that is oriented within plus or minus thirty degrees of perpendicular to the first direction, the first protrusion 51b is cylindrical, and the second protrusion 52b comprises a cantilever beam located in a cavity 58 of the camera system 4a to help secure the camera system 4a to the power outlet 33.

In some embodiments, the first direction is within plus or minus thirty degrees of being directly upward, and the second direction is within plus or minus thirty degrees of being horizontal.

In several embodiments, the mounting system 2b comprises the camera system 4a. The camera system 4a can comprise a second base 59 having a cavity 58. The second base 59 of the camera system 4a can be coupled to the first base 6b by the first protrusion 51b and the second protrusion 52b. At least a portion of the first protrusion 51b and a portion of the second protrusion 52b can be located in the cavity 58. At least a portion of the camera system 4a can be secured between the second protrusion 52b and the first base 6b.

In some embodiments, the mounting system 2b comprises a flex arm 18 coupled to the first base 6b, a retention lip 20 coupled to the first base 6b by the flex arm 18, and a cavity 78 formed at least in part by the flex arm 18 and the first base 6b. The retention lip 20 can be configured to engage a portion of a stand 61 of the camera system 4a to impede the camera system 4a from uncoupling from the mounting system 2b. The flex arm 18 can comprise a cantilever beam configured to bend into the cavity 78 to facilitate coupling the camera system 4a to the mounting system 2b and uncoupling the camera system 4a from the mounting system 2b.

In several embodiments, the retention lip 20 is configured to engage an outer perimeter 62 of a stand 61 of the camera system 4a to impede the camera system 4a from uncoupling from the mounting system 2b. The flex arm 18 can be configured to bend into the cavity 78 to facilitate coupling the camera system 4a to the mounting system 2b and to facilitate uncoupling the camera system 4a from the mounting system 2b.

In some embodiments, the mounting system 2b comprises a flex arm 18 coupled to the first base 6b and a retention lip 20 coupled to the first base 6b by the flex arm 18. The retention lip 20 can protrude upward. The flex arm 18 can be configured to enable the retention lip 20 to move downward to facilitate coupling the camera system 4a to the mounting system 2b. The retention lip 20 can be configured to impede uncoupling the camera system 4a from the mounting system 2b.

In several embodiments, the mounting system 2b comprises a flex arm 18 coupled to the first base 6b, and a retention lip 20 coupled to the first base 6b by the flex arm 18. The flex arm 18 can be configured to enable the retention lip 20 to move to facilitate coupling the camera system 4a to the mounting system 2b. The retention lip 20 can be configured to impede uncoupling the camera system 4a from the mounting system 2b until the flex arm 18 is bent. The second protrusion 52b can be located farther upward than the flex arm 18 and the retention lip 20 even though the second protrusion 52b, the flex arm 18, and the retention lip 20 are not aligned. (For example, the second protrusion 52b, the flex arm 18, and the retention lip 20 are typically not located in series in an outward direction.)

In some embodiments, the mounting system 2b comprises camera system 4a, a flex arm 18 coupled to the first base 6b, and a retention lip 20 coupled to the first base 6b by the flex arm 18. The camera system 4a can comprise a stand 61 having an outer perimeter 62. The second protrusion 52b can be located within a cavity 58 of the stand 61. The retention lip 20 can be located farther radially than the outer perimeter 62 of the stand 61 such that at least one of the first protrusion 51b and the second protrusion 52b impede the camera system 4a from sliding off the first base 6b in a fifth direction and the retention lip 20 impedes the camera system 4a from sliding off the first base 6b in a sixth direction that is opposite the fifth direction.

All of the features described in the context of FIGS. 13-24 can be combined with each other. All of the features described in the context of FIGS. 1-12 can be combined all of the features described in the context of FIGS. 13-24. Some features are not described in the context of every embodiment to avoid unnecessary redundancy. Some features are not labeled in every figure to increase the clarity of other features.

Figure 26:
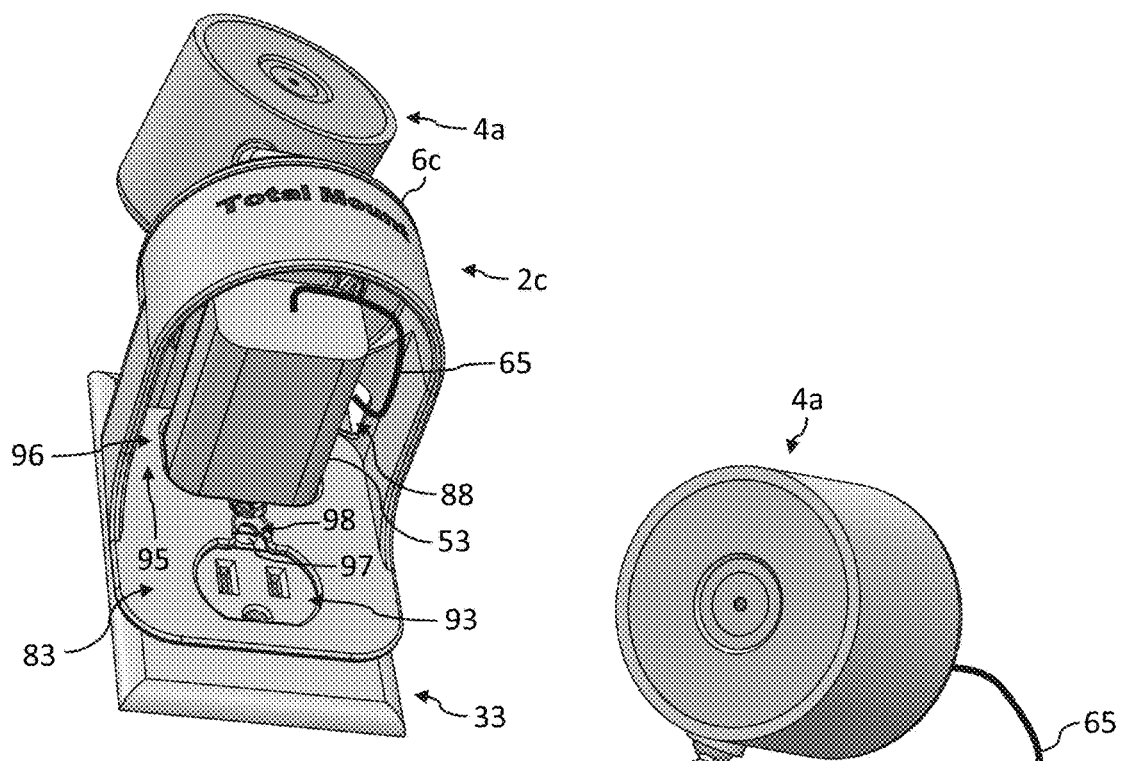
FIGS. 26 and 27 illustrate perspective views of the mounting system shown in FIG. 25, according to some embodiments.
Figure 27:
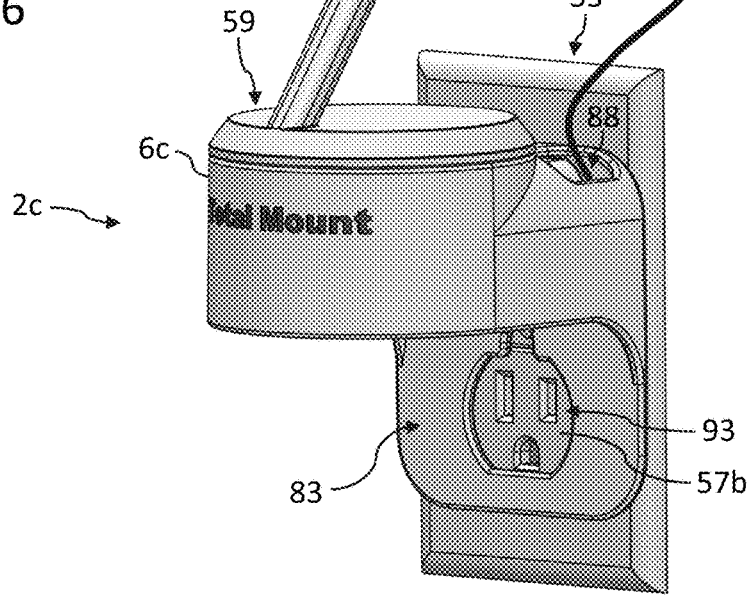

FIG. 27 illustrates a perspective view of a mounting system 2c that couples a camera system 4a (which can include a camera and a camera base) to a power outlet 33 that is coupled to a wall of a building. FIG. 26 illustrates a perspective view of the mounting system 2c from an angle that permits viewing the plug 53 located inside a cavity 95 of the mounting system 2c. The cavity 95 can help hide the plug 53 from people walking by the power outlet 33 to create an uncluttered appearance. The mounting system 2c can include a hole 88 through which the cable 65 can be routed (e.g. as indicated by arrow 108) to help hide portions of the cable 65 to create a streamlined appearance.

Figure 25:
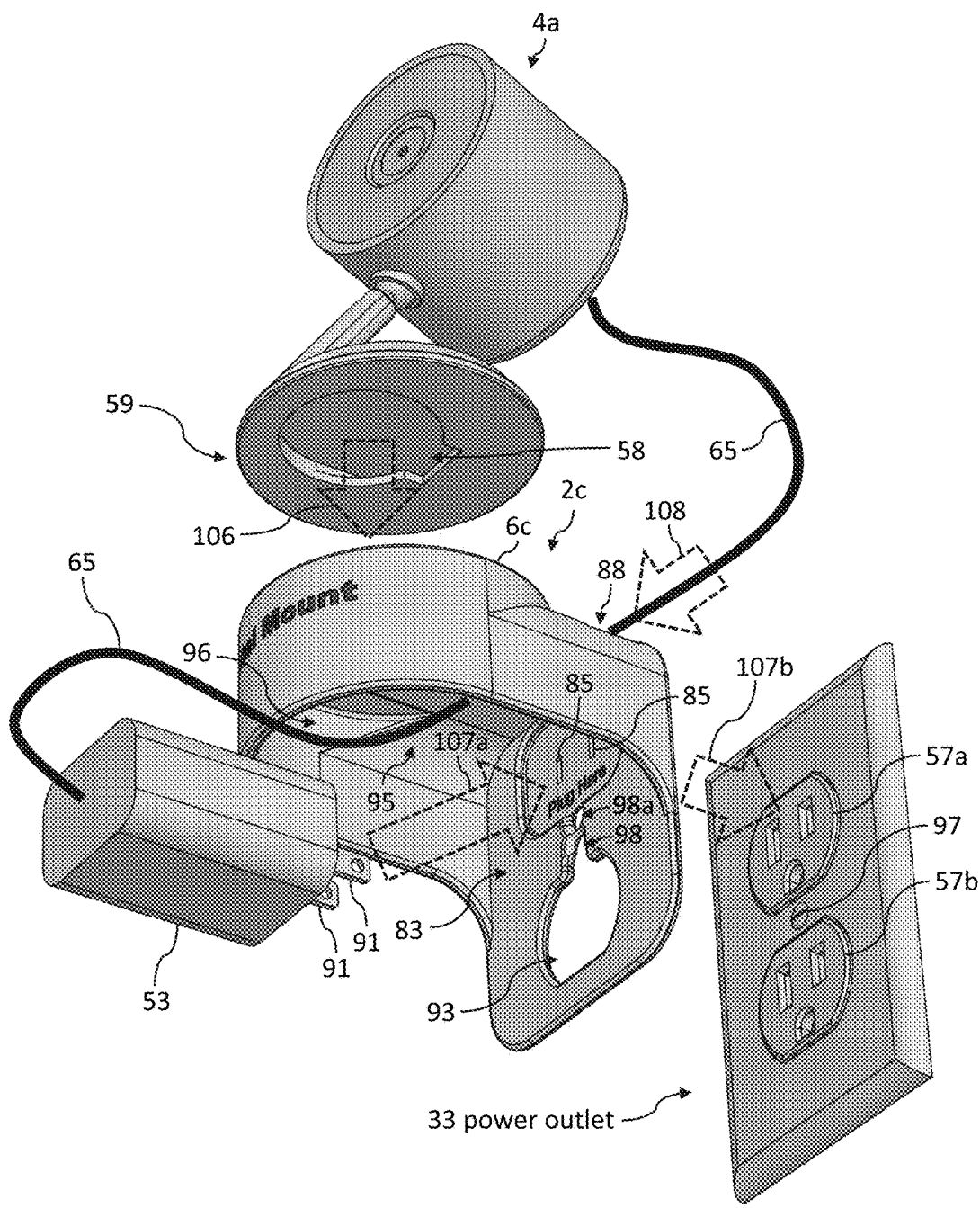
FIG. 25 illustrates a perspective view of a mounting system prior to the various components of the mounting system being assembled, according to some embodiments.

FIG. 25 illustrates a perspective view of a mounting system 2c prior to the various components of the mounting system 2c being assembled. Arrows in FIG. 25 generally indicate how various components can be assembled. The camera system 4a can be coupled to a top portion of the mounting system 2c (e.g., as indicated by arrow 106). The mounting system 2c can include a portion that releasably locks into a cavity 58 of a base 59 of the camera system 4a.

A plug 53 of the camera system can include power prongs 91, which are often metal to conduct electricity from the power outlet 33 to the camera system 4a via an electrical cable 65. The power prongs 91 can be inserted into holes 85 (of the mounting system 2c) and then into a receptacle 57a of the power outlet (e.g., as indicated by arrows 107a, 107b).

Figures 28, 29:
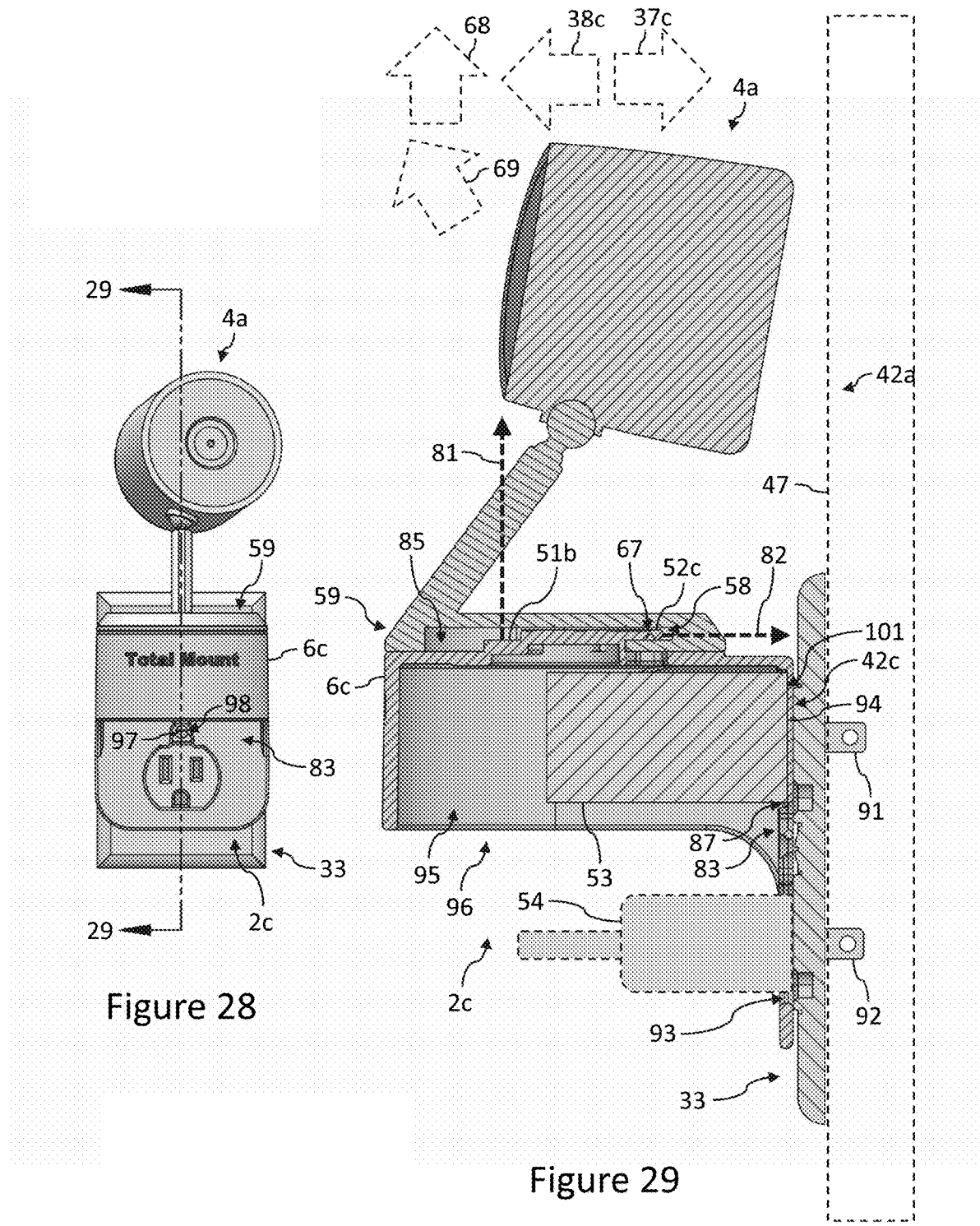
FIG. 28 illustrates a front view of the mounting system shown in FIG. 25, according to some embodiments.
FIG. 29 illustrates a cross-sectional view taken along line 29 from FIG. 28, according to some embodiments.

FIG. 28 illustrates a front view of a system 2c. FIG. 29 illustrates a cross-sectional view taken along line 29 of FIG. 28. The prongs are electrically coupled to a building. The electrical system of the building is hidden to increase the clarity of the prongs.

Figure 30:
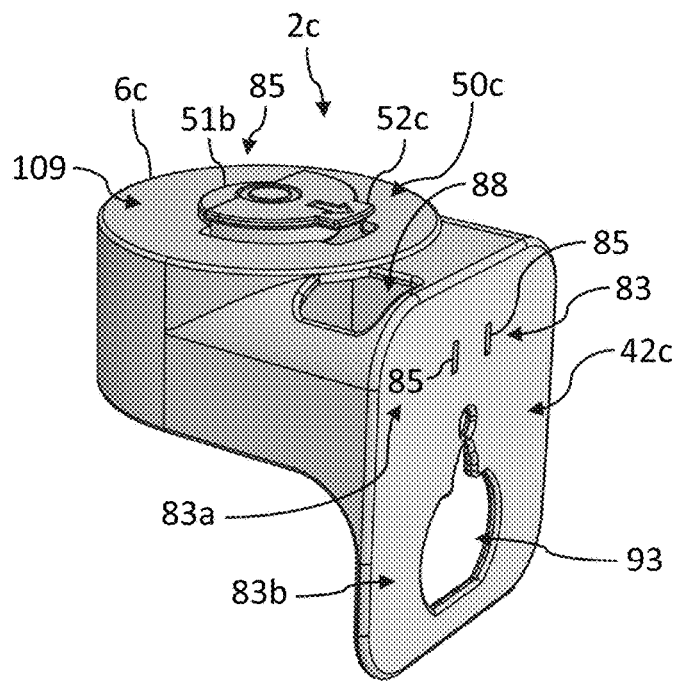
FIGS. 30-32 illustrate various perspective views of the mounting system shown in FIG. 25, according to some embodiments.
Figure 31:
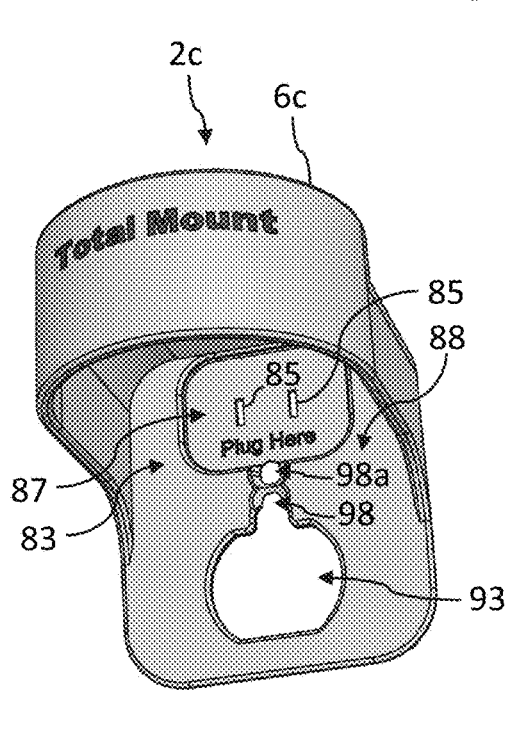
Figure 32:
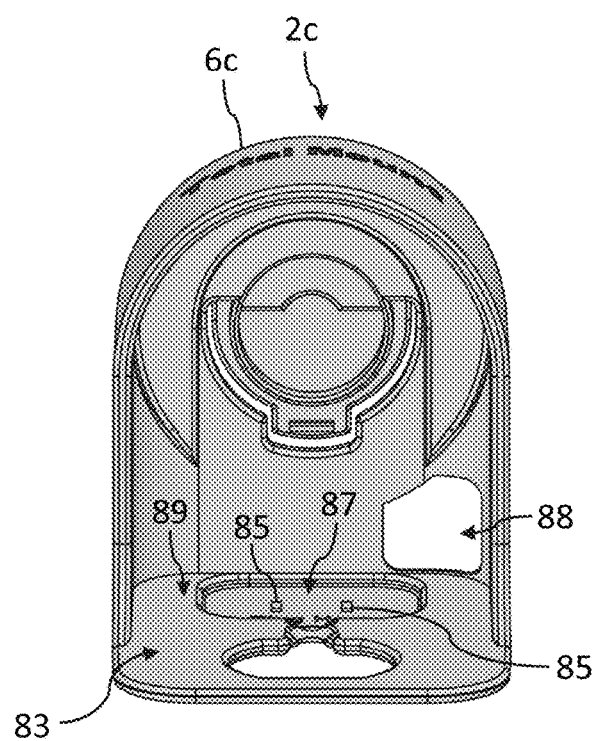

FIGS. 30-32 illustrate various perspective views of a mounting system 2c. The camera system 4a, the plug 53, the power outlet 33, and the wall 47 are hidden in FIGS. 30-32 to increase the clarity of other features.

Figure 33:
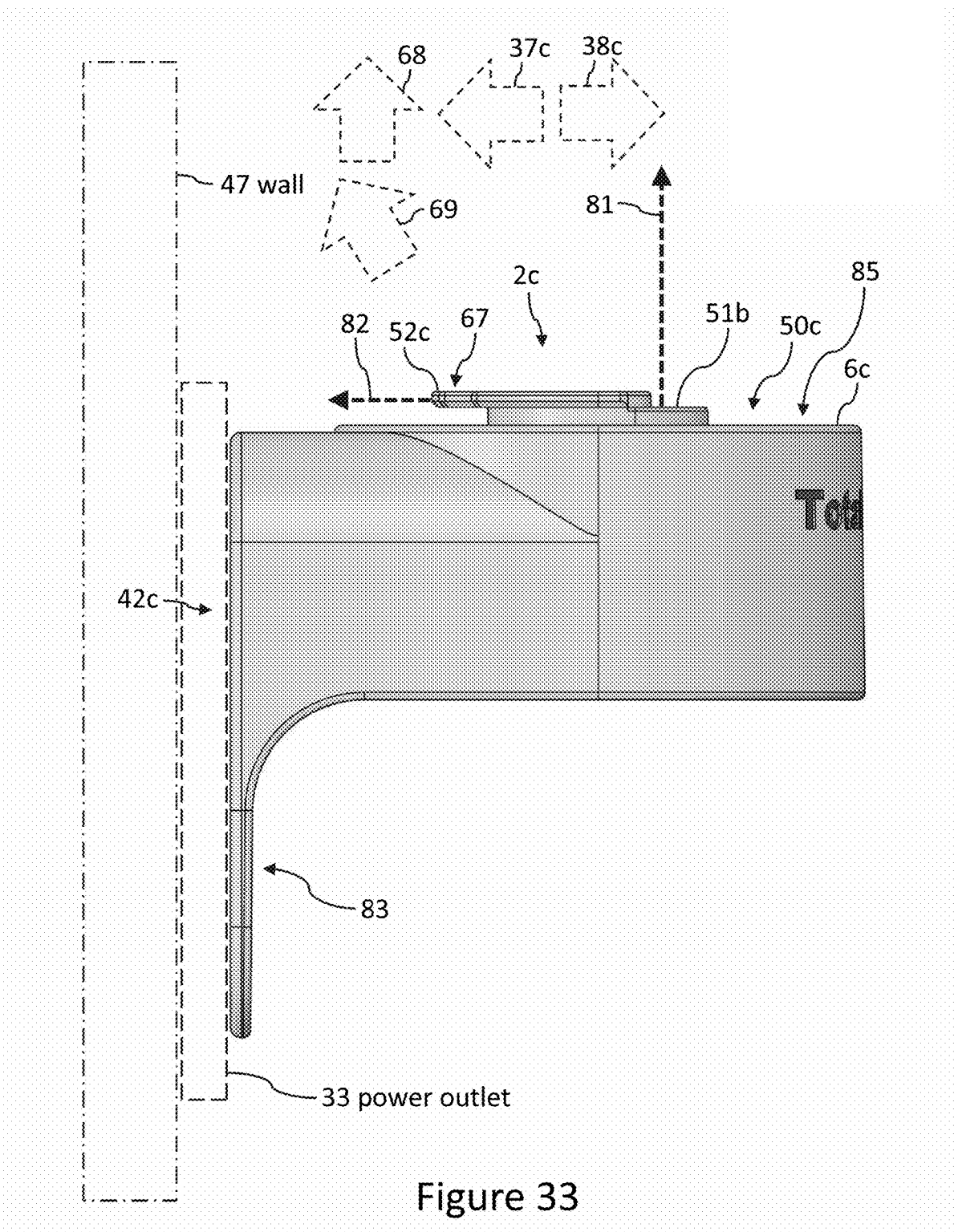
FIG. 33 illustrates a side view of the mounting system shown in FIG. 25, according to some embodiments.

FIG. 33 illustrates a side view of the mounting system 2c. The camera system 4a is hidden in FIG. 33 to increase the clarity of other features.

Figure 34:
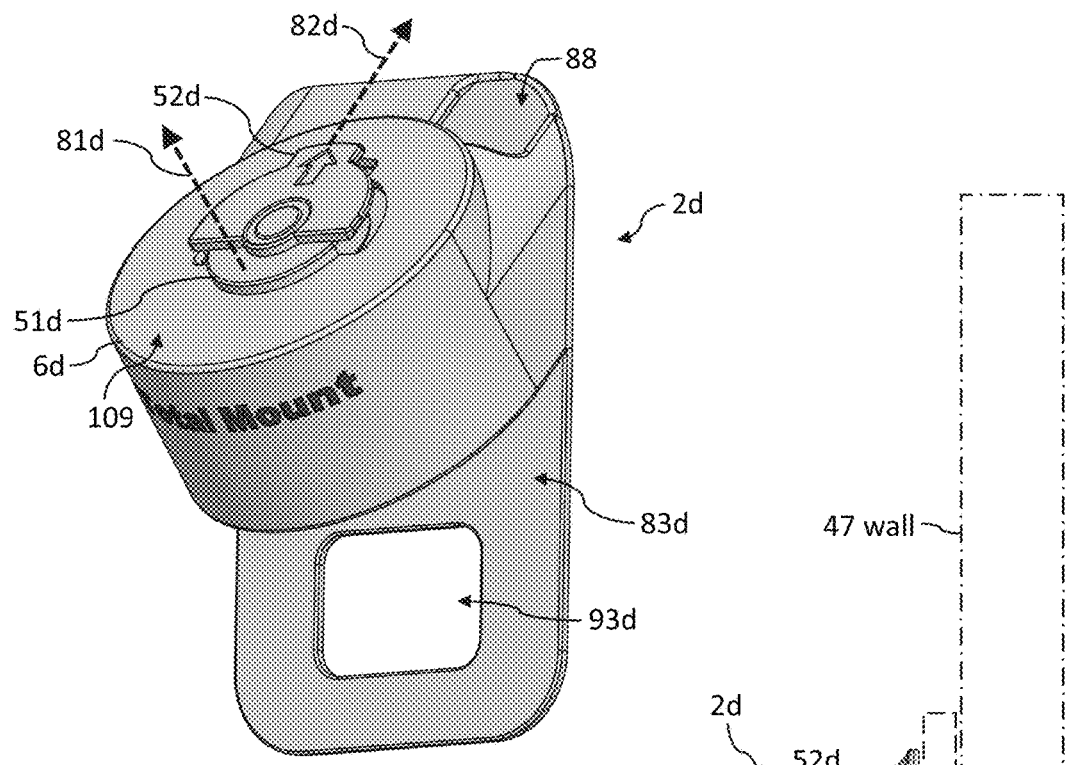
FIG. 34 illustrates a perspective view of a modified version of the mounting system shown in FIG. 25, according to some embodiments.
Figure 35:
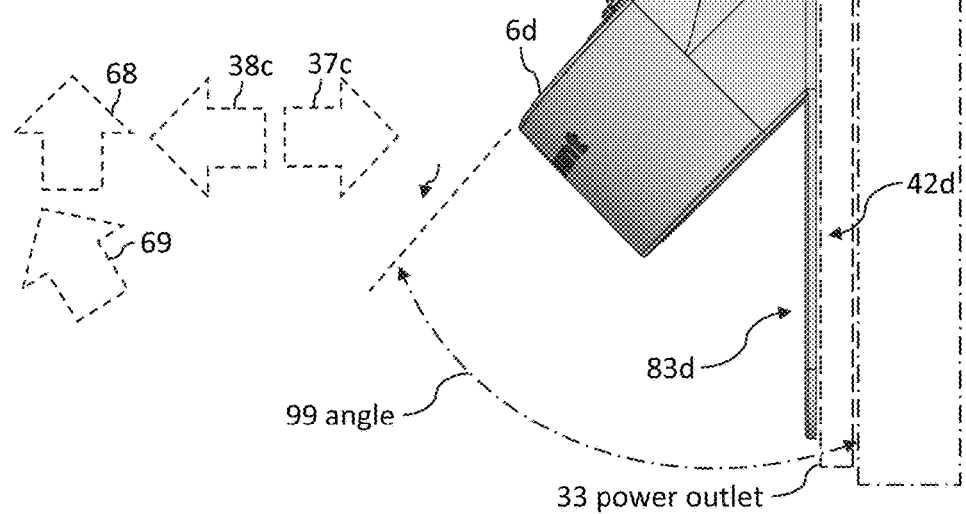
FIG. 35 illustrates a side view of a modified version of the mounting system shown in FIG. 25, according to some embodiments.

FIGS. 34 and 35 illustrate an embodiment that is similar to the embodiment illustrated in FIGS. 25-33 except that the first base 6d is oriented at an angle 99 rather than being horizontal. The angle 99 can be measured relative to the wall 47, an outward face of the power outlet 33, or an inward side 42d of the mounting system 2d. In some embodiments, the angle 99 is less than 15 degrees, less than 85 degrees, less than 25 degrees, less than 65 degrees, greater than 10 degrees, and/or greater than 40 degrees.

The system 2d can include a first protrusion 51d that protrudes in a first direction 81d, a second protrusion 52d that protrudes in a second direction 82d, a plate 83d, holes 93 in the plate 83d, and all the other features described in the context of FIGS. 25-33 and/or in the context of FIGS. 1-24.

All of the features described in the context of FIGS. 25-35 can be combined with each other. All of the features described in the context of FIGS. 1-12 can be combined all of the features described in the context of FIGS. 25-33. All of the features described in the context of FIGS. 13-24 can be combined all of the features described in the context of FIGS. 25-33. Some features are not described in the context of every embodiment to avoid unnecessary redundancy. Some features are not labeled in every figure to increase the clarity of other features.

FIG. 29 includes arrows to indicate inward and outward directions. Arrow 37c indicates an inward direction. Arrow 38c indicates an outward direction. Unless otherwise indicated herein, "inward" is used in a broad sense to mean a direction towards an object 47, 33 to which the mounting system 2c couples the camera system 4a. A mounting system 2c can comprise an inward side even if the mounting system 2c is not yet coupled to an object 47, 33 used to support the mounting system 2c. For example, a mounting system 2c can be configured to couple a camera system 4a to an object 47, 33 even if the object 47, 33 is not yet present. The side configured to face the object 47, 33 is the inward side even if the object 47, 33 is not yet present.

Unless otherwise indicated herein, "directly upward" is used in a broad sense to mean a direction that is perpendicular to inward. A direction can be upward even if the direction is not directly upward. For example, in FIG. 20, arrow 68 is oriented directly upward, and arrow 69 is oriented upward, but not directly upward because it is not perpendicular to inward arrow 37c. Unless otherwise indicated herein, "downward" is a direction that is opposite relative to "upward."

Referring now primarily to FIGS. 25-33, mounting systems 2c can comprise a first base 6c configured to couple the camera system 4a to a power outlet 33. The first base 6c comprises an inward side 42c configured to face towards a wall 47 of a building to which the power outlet 33 is coupled. The first base 6c comprises an upward side 50c (which can be horizontal or can be oriented at a slanted angle as illustrated in FIGS. 34 and 35).

Mounting systems can comprise a first protrusion 51b that protrudes from the upward side 50c and a second protrusion 52c coupled to the first base 6c by the first protrusion 51b. The second protrusion 52c is configured to removably secure the camera system 4a to the first base 6c by entering a first cavity 58 of the camera system 4a.

The first protrusion 51b can be a first disk. The second protrusion 52c can be at least a portion of a second disk with a cantilever beam 67 coupled to an outer perimeter of the second disk.

The upward side 50c can be oriented within plus or minus twenty degrees of perpendicular to the inward side 42c.

The second protrusion 52c comprises a cantilever beam 67 that protrudes inward away from the first protrusion 51b.

The first protrusion 51b protrudes from the upward side 50c in a first direction 81. The second protrusion 52c protrudes away from the first protrusion 51b in a second direction 82 that is within plus or minus thirty degrees of perpendicular to the first direction 81.

The first direction 81 is within plus or minus thirty degrees of being directly upward. The second direction 82 is within plus or minus thirty degrees of being horizontal.

The mounting system 2c can comprise the camera system 4a. The camera system 4a comprises a second base 59 having the first cavity 58. The second base 59 of the camera system 4a is coupled to the first base 6c by the first protrusion 51b and the second protrusion 52c. At least a portion of the first protrusion 51b and at least a portion of the second protrusion 52c are located in the first cavity 58. A portion of the camera system 4a is secured between the second protrusion 52c and the first base 6c (e.g., as illustrated in FIG. 29).

The first base 6c comprises a plate 83 configured to rest against the power outlet 33. The first base 6c extends outward from the plate 83 such that the first base 6c forms a shelf 85 configured to hold the camera system 4a. The shelf 85 comprises the first protrusion 51b and the second protrusion 52c such that the first protrusion 51b and the second protrusion 52c removably secure the camera system 4a to the shelf 85.

As used herein, "extends" does not mean to get longer, but instead means to protrude.

The shelf 85 can be oriented within plus or minus twenty degrees of perpendicular relative to the plate 83. In some embodiments, the shelf 85 is oriented within plus or minus eighty degrees of perpendicular relative to the plate 83.

The shelf 85 comprises a circular flat area 109 on which the camera system 4a rests. The first protrusion 51b protrudes from a center region of the circular flat area 109 (e.g., as illustrated in FIG. 30) into the first cavity 58 of the camera system 4a such that the second protrusion 52c removably secures the camera system 4a to the power outlet 33 (e.g., as illustrated in FIG. 29).

The shelf 85 comprises a fourth hole 88. An electrical cable 65 is electrically coupled to the camera system 4a, passes through the fourth hole 88, and is electrically coupled to a first plug 53 of the camera system 4a while the first plug 53 couples the mounting system 2c to the power outlet 33. The fourth hole 88 can face upwards, sideways, and/or any suitable direction.

The camera system 4a comprises a first plug 53 having a first power prong 91 configured to electrically couple the first plug 53 to the power outlet 33. The plate 83 comprises a first hole 85 oriented towards the power outlet 33. The first power prong 91 is located at least partially in the first hole 85 and at least partially in the power outlet 33 such that the first plug 53 is adapted to secure the first base 6c to the power outlet 33.

The first protrusion 51b is cylindrical. The second protrusion 52c comprises a cantilever beam 67 located in the first cavity 58 of the camera system 4a to help secure the camera system 4a to the power outlet 33.

The first protrusion 51b protrudes from the upward side 50c in a first direction 81. The first hole 85 comprises a central axis that is oriented within plus or minus thirty degrees of perpendicular to the first direction 81.

The first base 6c comprises a plate 83 configured to rest against the power outlet 33. The first base 6c extends outward from the plate 83.

The plate 83 comprises an upper area 83a and a lower area 83b. The camera system 4a comprises a first plug 53 having a first power prong 91 configured to electrically couple the first plug 53 to the power outlet 33. The upper area 83a of the plate 83 comprises a first hole 85 oriented towards the power outlet 33. The first power prong 91 is located at least partially in the first hole 85 and at least partially in the power outlet 33 such that the first plug 53 is adapted to secure the first base 6c to the power outlet 33.

The upper area 83a comprises an indentation 87 in which a portion of the first plug 53 is located. The indentation 87 is configured such that a first thickness of the plate 83 in the indentation 87 is at least thirty percent less than a second thickness of the upper area 83a immediately outside (e.g., see areas 88, 89) the indentation 87 such that the indentation 87 is configured to enable the first power prong 91 to enter deeper into the power outlet 33 (than would be the case if the indentation 87 were not present).

The lower area 83b of the plate 83 comprises a second hole 93 configured to enable a second power prong 92 of a second plug 54 to pass through the second hole 93 and into a lower receptacle 57b of the power outlet 33 while the first power prong 91 of the first plug 53 is located at least partially in an upper receptacle 57a of the power outlet 33.

The upper area 83a of the plate 83 couples the lower area 83b of the plate 83 to the first protrusion 51b. At least a portion 94 of the upper area 83a is located between the first plug 53 and the power outlet 33.

The camera system 4a comprises a first plug 53 having a first power prong 91 configured to electrically couple the first plug 53 to the power outlet 33. The first base 6c comprises a second cavity 95 formed at least partially by the plate 83 (e.g., as illustrated in FIG. 25). The second cavity 95 comprises a downward facing opening 96 configured to enable inserting the first plug 53 through the opening and into the second cavity 95. The first plug 53 is located in the second cavity 95 (e.g., as illustrated in FIG. 29). The plate 83 comprises a first hole 85 oriented towards the power outlet 33. The first power prong 91 is located at least partially in the first hole 85 and at least partially in the power outlet 33 such that the first plug 53 is adapted to secure the first base 6c to the power outlet 33.

The plate 83 extends downward relative to the second cavity 95 such that the plate 83 rests against an upper receptacle 57a of the power outlet 33 and against a lower receptacle 57b of the power outlet 33 while a camera of the camera system 4a is located upward relative to both the first and second receptacles. A receptacle (such as receptacle 57a or 57b) can include several holes (e.g., a positive hole, a negative hole, and a ground hole).

The mounting system 2c can include a screw 97. The plate 83 can comprise a third hole 98, 98a. The screw 97 is located partially in the third hole 98, 98a and partially in a threaded hole of the power outlet 33 such that the screw 97 couples the mounting system 2c to the power outlet 33.

The mounting system 2c can include the camera system 4a and a first base 6c that couples the camera system 4a to a power outlet 33. The first base 6c comprises an inward side 42c configured to face towards a wall 47 of a building to which the power outlet 33 is coupled. The first base 6c comprises a circular flat area 109. The mounting system 2c can comprise a first protrusion 51b that protrudes from the first base 6c; and a second protrusion 52c coupled to the first base 6c by the first protrusion 51b. The second protrusion 52c protrudes away from the first protrusion 51b and is configured to removably secure the camera system 4a to the first base 6c by entering a first cavity 58 of the camera system 4a.

The second protrusion 52c comprises a cantilever beam 67 located in the first cavity 58 of the camera system 4a to help secure the camera system 4a to the power outlet 33. The first protrusion 51b protrudes from a center region of the circular flat area 109 into the first cavity 58 of the camera system 4a such that the second protrusion 52c removably secures the camera system 4a to the power outlet 33.

The first base 6c comprises a plate 83 configured to rest against the power outlet 33. The camera system 4a comprises a first plug 53 having a first power prong 91 that protrudes inward from an inward facing wall 101 of the first plug 53. The first power prong 91 is configured to electrically couple the first plug 53 to the power outlet 33. The plate 83 comprises a first hole 85 oriented towards the power outlet 33. The first power prong 91 is located at least partially in the first hole 85 and at least partially in the power outlet 33 such that the first plug 53 is adapted to secure the first base 6c to the power outlet 33. The plate 83 is secured between the inward facing wall 101 and the power outlet 33.

The first protrusion 51b protrudes from the first base 6c in a first direction 81, 81d, and the second protrusion 52c protrudes away from the first protrusion 51b in a second direction 82, 82d that is within plus or minus thirty degrees of perpendicular to the first direction 81.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

I claim:

1. A mounting system for a camera system, the mounting system comprising:
    a first base configured to couple the camera system to a power outlet, wherein the first base comprises an inward side configured to face towards a wall of a building to which the power outlet is coupled, and the first base comprises an upward side;
    a first protrusion that protrudes from the upward side; and
    a second protrusion coupled to the first base by the first protrusion, wherein the second protrusion is configured to removably secure the camera system to the first base by entering a first cavity of the camera system.

2. The mounting system of claim 1, wherein the upward side is oriented within plus or minus twenty degrees of perpendicular to the inward side.

3. The mounting system of claim 1, wherein the second protrusion comprises a cantilever beam that protrudes inward away from the first protrusion.

4. The mounting system of claim 1, wherein the first protrusion protrudes from the upward side in a first direction, and the second protrusion protrudes away from the first protrusion in a second direction that is within plus or minus thirty degrees of perpendicular to the first direction.

5. The mounting system of claim 4, wherein the first direction is within plus or minus thirty degrees of being directly upward, and the second direction is within plus or minus thirty degrees of being horizontal.

6. The mounting system of claim 1, further comprising the camera system, wherein the camera system comprises a second base having the first cavity, the second base of the camera system is coupled to the first base by the first protrusion and the second protrusion, at least a portion of the first protrusion and at least a portion of the second protrusion are located in the first cavity, and a portion of the camera system is secured between the second protrusion and the first base.

7. The mounting system of claim 1, further comprising the camera system, wherein the first base comprises a plate configured to rest against the power outlet, and the first base extends outward from the plate such that the first base forms a shelf configured to hold the camera system, wherein the shelf comprises the first protrusion and the second protrusion such that the first protrusion and the second protrusion removably secure the camera system to the shelf.

8. The mounting system of claim 7, wherein the shelf is oriented within plus or minus twenty degrees of perpendicular relative to the plate.

9. The mounting system of claim 7, wherein the shelf comprises a circular flat area on which the camera system rests, and the first protrusion protrudes from a center region of the circular flat area into the first cavity of the camera system such that the second protrusion removably secures the camera system to the power outlet.

10. The mounting system of claim 7, wherein the shelf comprises a fourth hole, and wherein an electrical cable is electrically coupled to the camera system, passes through the fourth hole, and is electrically coupled to a first plug of the camera system while the first plug couples the mounting system to the power outlet.

11. The mounting system of claim 7, wherein the camera system comprises a first plug having a first power prong configured to electrically couple the first plug to the power outlet, wherein the plate comprises a first hole oriented towards the power outlet, and the first power prong is located at least partially in the first hole and at least partially in the power outlet such that the first plug is adapted to secure the first base to the power outlet.

12. The mounting system of claim 11, wherein the first protrusion is cylindrical, and the second protrusion comprises a cantilever beam located in the first cavity of the camera system to help secure the camera system to the power outlet.

13. The mounting system of claim 12, wherein the first protrusion protrudes from the upward side in a first direction, and the first hole comprises a central axis that is oriented within plus or minus thirty degrees of perpendicular to the first direction.

14. The mounting system of claim 1, further comprising the camera system, wherein the first base comprises a plate configured to rest against the power outlet, and the first base extends outward from the plate.

15. The mounting system of claim 14, wherein the plate comprises an upper area and a lower area, the camera system comprises a first plug having a first power prong configured to electrically couple the first plug to the power outlet, wherein the upper area of the plate comprises a first hole oriented towards the power outlet, and the first power prong is located at least partially in the first hole and at least partially in the power outlet such that the first plug is adapted to secure the first base to the power outlet.

16. The mounting system of claim 15, wherein the upper area comprises an indentation in which a portion of the first plug is located, wherein the indentation is configured such that a first thickness of the plate in the indentation is at least thirty percent less than a second thickness of the upper area immediately outside the indentation such that the indentation is configured to enable the first power prong to enter deeper into the power outlet.

17. The mounting system of claim 15, wherein the lower area of the plate comprises a second hole configured to enable a second power prong of a second plug to pass through the second hole and into a lower receptacle of the power outlet while the first power prong of the first plug is located at least partially in an upper receptacle of the power outlet.

18. The mounting system of claim 15, wherein the upper area of the plate couples the lower area of the plate to the first protrusion, and at least a portion of the upper area is located between the first plug and the power outlet.

19. The mounting system of claim 14, wherein the camera system comprises a first plug having a first power prong configured to electrically couple the first plug to the power outlet, the first base comprises a second cavity formed at least partially by the plate, wherein the second cavity comprises a downward facing opening configured to enable inserting the first plug through the opening and into the second cavity, wherein the first plug is located in the second cavity, the plate comprises a first hole oriented towards the power outlet, and the first power prong is located at least partially in the first hole and at least partially in the power outlet such that the first plug is adapted to secure the first base to the power outlet.

20. The mounting system of claim 19, wherein the plate extends downward relative to the second cavity such that the plate rests against an upper receptacle of the power outlet and against a lower receptacle of the power outlet while a camera of the camera system is located upward relative to both the first and second receptacles.

21. The mounting system of claim 19, further comprising a screw, wherein the plate comprises a third hole, and the screw is located partially in the third hole and partially in a threaded hole of the power outlet such that the screw couples the mounting system to the power outlet.

22. A mounting system for a camera system, the mounting system comprising:
the camera system;
a first base that couples the camera system to a power outlet, wherein the first base comprises an inward side configured to face towards a wall of a building to which the power outlet is coupled, wherein the first base comprises a circular flat area;
a first protrusion that protrudes from the first base; and
a second protrusion coupled to the first base by the first protrusion, wherein the second protrusion protrudes away from the first protrusion and is configured to removably secure the camera system to the first base by entering a first cavity of the camera system,
wherein the second protrusion comprises a cantilever beam located in the first cavity of the camera system to help secure the camera system to the power outlet, and
the first protrusion protrudes from a center region of the circular flat area into the first cavity of the camera system such that the second protrusion removably secures the camera system to the power outlet.

23. The mounting system of claim 22, wherein the first base comprises a plate configured to rest against the power outlet, the camera system comprises a first plug having a first power prong that protrudes inward from an inward facing wall of the first plug, the first power prong is configured to electrically couple the first plug to the power outlet, the plate comprises a first hole oriented towards the power outlet, the first power prong is located at least partially in the first hole and at least partially in the power outlet such that the first plug is adapted to secure the first base to the power outlet, and the plate is secured between the inward facing wall and the power outlet.

24. The mounting system of claim 22, wherein the first protrusion protrudes from the first base in a first direction, and the second protrusion protrudes away from the first protrusion in a second direction that is within plus or minus thirty degrees of perpendicular to the first direction.

* * * * *